US 11,785,289 B2

(12) United States Patent
Igarashi et al.

(10) Patent No.: US 11,785,289 B2
(45) Date of Patent: *Oct. 10, 2023

(54) RECEIVING DEVICE, TRANSMITTING DEVICE, AND DATA PROCESSING METHOD

(71) Applicant: Saturn Licensing LLC, New York, NY (US)

(72) Inventors: Tatsuya Igarashi, Tokyo (JP); Norifumi Kikkawa, Tokyo (JP); Yoshiharu Dewa, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,228

(22) Filed: Jun. 16, 2021

(65) Prior Publication Data

US 2021/0314657 A1    Oct. 7, 2021

Related U.S. Application Data

(63) Continuation of application No. 15/508,535, filed as application No. PCT/JP2015/079098 on Oct. 14, 2015, now Pat. No. 11,070,872.

(30) Foreign Application Priority Data

Oct. 20, 2014 (JP) .................. 2014-213498

(51) Int. Cl.
*H04N 21/2668* (2011.01)
*H04N 21/44* (2011.01)
(Continued)

(52) U.S. Cl.
CPC ..... *H04N 21/44004* (2013.01); *H04N 21/431* (2013.01); *H04N 21/433* (2013.01);
(Continued)

(58) Field of Classification Search
CPC .................................... H04N 21/2668
See application file for complete search history.

(56) References Cited

U.S. PATENT DOCUMENTS

| 7,426,734 B2 | 9/2008 | Debique et al. |
| 2004/0004631 A1* | 1/2004 | Debique ............. H04L 65/1101 715/704 |

(Continued)

FOREIGN PATENT DOCUMENTS

| EP | 2 897 369 A1 | 7/2015 |
| JP | 2002-268999 A | 9/2002 |

(Continued)

OTHER PUBLICATIONS

International Search Report dated Jan. 19, 2016, in PCT/JP2015/079098, filed Oct. 14, 2015.

(Continued)

*Primary Examiner* — Michael H Hong
(74) *Attorney, Agent, or Firm* — Jeffery J Brosemer

(57) ABSTRACT

A receiving device is provided. The receiving devices includes circuitry that is configured to execute an application related to a program or a channel, The circuitry is configured to set, based on the application, broadcast reception data from a broadcast as a media source object corresponding to a processing object of media reproduction. The circuitry is configured to obtain, based on the application, broadcast content segment information of broadcast content in the broadcast reception data that is stored in a buffer associated with the media source object. The circuitry is configured to perform, based on the application and the broadcast content segment information of a segment of the broadcast content to be replaced being obtained, replacement or appendance of (Continued)

the broadcast content in the broadcast reception data stored in the buffer with network content in application reception data received via a network.

21 Claims, 19 Drawing Sheets

(51) Int. Cl.
    *H04N 21/438*     (2011.01)
    *H04N 21/431*     (2011.01)
    *H04N 21/442*     (2011.01)
    *H04N 21/435*     (2011.01)
    *H04N 21/433*     (2011.01)
    *H04N 21/643*     (2011.01)

(52) U.S. Cl.
    CPC ......... *H04N 21/435* (2013.01); *H04N 21/438* (2013.01); *H04N 21/44* (2013.01); *H04N 21/442* (2013.01); *H04N 21/44209* (2013.01); *H04N 21/643* (2013.01); *H04N 21/2668* (2013.01)

(56) References Cited

U.S. PATENT DOCUMENTS

| | | | |
|---|---|---|---|
| 2008/0040743 A1* | 2/2008 | Dharmaji | H04N 21/44016 725/35 |
| 2009/0007159 A1 | 1/2009 | Rangarajan et al. | |
| 2010/0128595 A1 | 5/2010 | Karaoguz et al. | |
| 2011/0307623 A1 | 12/2011 | George et al. | |
| 2012/0042348 A1 | 2/2012 | Karaoguz et al. | |
| 2012/0095819 A1* | 4/2012 | Li | G06Q 30/02 705/14.23 |
| 2012/0099022 A1 | 4/2012 | Sundy et al. | |
| 2012/0259994 A1 | 10/2012 | Gillies et al. | |
| 2014/0120861 A1 | 5/2014 | Kwak et al. | |
| 2014/0297882 A1 | 10/2014 | Estrop et al. | |
| 2015/0043885 A1 | 2/2015 | Yamakage | |
| 2015/0074713 A1 | 3/2015 | Karaoguz et al. | |
| 2015/0095511 A1* | 4/2015 | McGowan | H04N 21/812 709/231 |
| 2015/0215369 A1 | 7/2015 | Yamagishi | |

FOREIGN PATENT DOCUMENTS

| | | |
|---|---|---|
| JP | 2011-87103 A | 4/2011 |
| JP | 2013-9332 A | 1/2013 |
| KR | 10-2004-0037147 A | 5/2004 |
| WO | 2014/115389 A1 | 7/2014 |
| WO | 2014/162748 A1 | 10/2014 |

OTHER PUBLICATIONS

Extended European Search Report dated Mar. 26, 2018 in corresponding European Patent Application No. 15852053.6, 12 pages.
Japanese Office Action dated Jun. 18, 2019 in Patent Application No. 2016-555190.

* cited by examiner

RECEIVING DEVICE, TRANSMITTING DEVICE, AND DATA PROCESSING METHOD

RELATED APPLICATIONS

This application is a continuation of U.S. Ser. No. 15/508,535, filed on Mar. 3, 2017, which is incorporated by reference. U.S. Ser. No. 15/508,535 is a National Stage of PCT/JP2015/079098, filed on Oct. 14, 2015, and claims the benefit of priority under 35 U.S.C. § 119 of Japanese Application No. 2014-213498, filed Oct. 20, 2014.

TECHNICAL FIELD

The present disclosure relates to a receiving device, a transmitting device, and a data processing method. More particularly, the present disclosure relates to a receiving device and a transmitting device for performing data transmission and reception, respectively, via a broadcast wave and a network, and a data processing method for communication data, for example.

BACKGROUND ART

Currently, development and standardization have been actively promoted for a system which receives a broadcast program or other content from a transmitting device providing the content, such as a broadcast station and a content server, and transmits the content to a receiving device such as a TV receiver, a personal computer (PC), and a portable terminal, by unidirectional communication such as a broadcast wave, or by bidirectional communication or unidirectional communication via a network such as the Internet.

In case of data transmission via a network, however, data reception at a constant bitrate may become difficult as a result of congestion or the like of the network.

For solving this problem, there has been proposed adaptive streaming which transmits segments corresponding to segmented files of data at a plurality of bitrates to a network, and allows selection and reproduction of segments at an optimal bitrate on the client side in accordance with a network status.

Dynamic Adaptive Streaming over HTTP (DASH) is an example of standards of this adaptive streaming. DASH provides standards for an adaptive streaming technology which uses HyperText Transfer Protocol (HTTP).

According to adaptive streaming, a content distribution server generates and retains segmented files of moving image content at a plurality of bitrates, and a manifest file describing attribute information and URL for these files to allow reproduction of distributed content by various clients.

Each of the clients receives the manifest file from the server, selects optimal bitrate content for a display unit size and an available communication band of the client device, and receives and reproduces the selected content. A dynamic change of bitrates is allowed in accordance with a change of network bands. The client is capable of switching and receiving optimal content corresponding to a status as necessary, wherefore moving image content reproduction is realizable while reducing a break of video images. Note that adaptive streaming is described in Patent Document 1 (Japanese Patent Application Laid-Open No. 2011-87103), for example.

MPEG-DASH standards are one of standards which define specifications for streaming distribution of Moving Picture Expert Group (MPEG) encoded moving images and audio data under foregoing DASH.

The MPEG-DASH standards include following two standards.
(a) standards for manifest file (media presentation description (MPD)) for describing metadata corresponding to management information on moving images and audio files
(b) standards for file format (segment format) for moving image content transmission For streaming distribution of MPEG data under DASH, processing in conformity with the MPEG-DASH standards is performed.

On the other hand, an HTML5 browser providing interactive services is included in the client (receiving device) receiving content distribution through broadcasting and the Internet to execute applications described in HTML5 on the client side.

The adaptive streaming described above is also controlled by HTML5 application JavaScript (registered trademark).

World Wide Web Consortium (W3C) corresponding to an international standards body for world wide web (WWW) application technologies specifies media source extensions (MSE)—application programming interface (API) as standards of API for this purpose.

This MSE-API allows an application to achieve not only adaptive streaming, but also insertion of advertisements matching with attributes of a user into content.

However, when the client (receiving device) such as a TV receiver superimposes data received via a network on reception data received via a broadcast wave, or outputs data received via a network in place of reception data via a broadcast wave under control by an application, for example, a delay of data output may be produced.

This problem is caused, in case of MSE-API, for example, by the necessity of a processing time for processing tuner reception data and network reception data by an application, and further for processing various types of data executed in a synthesis process.

Moreover, in case of superimposed display of a plurality of HTML5 videos in matched timing for insertion of advertisements, it is difficult to accurately match output timing of images of broadcast programs, voices and images of advertisements, and voices under control by the application.

This difficulty comes from the problem that an application execution environment such as an HTML5 browser is not suitable for real time processing with the application which requires matched timing with accuracy of one second or shorter deviation.

Furthermore, according to a broadcast system, it is general to switch and execute different applications for each program or channel. Accordingly, when video and audio data received via a broadcast wave, and video and audio data received via the Internet are controlled by an application on the basis of MSE-API, there is a serious problem of discontinuation in video and audio reproduction as a result of switching of programs and channels.

CITATION LIST

Patent Document

Patent Document 1: Japanese Patent Application Laid-Open No. 2011-87103

SUMMARY OF THE INVENTION

Problems to be Solved by the Invention

The present disclosure has been developed in consideration of the aforementioned problems, for example. It is an object of the present disclosure to provide a receiving device, a transmitting device, and a data processing method for performing a synthesis process of video and audio data received via a broadcast wave and via a network under an application, while reducing a reproduction delay and achieving reproduction of continuous images and audio data.

Solutions to Problems

A first aspect of the present disclosure is directed to a receiving device including a data processing unit that discloses a buffering process for reception data received by the receiving device as a media source object corresponding to a processing object of media reproduction by an application executed by the receiving device.

In addition, a second aspect of the present disclosure is directed to a transmitting device including a communication unit that transmits an application used by a receiving device. The application executes a synthesis process of reception data received by the receiving device and application reception data received by the application on the basis of a media source object that discloses a buffering process for the reception data.

In addition, a third aspect of the present disclosure is directed to a data processing method performed by a receiving device. A data processing unit of the receiving device sets reception data as a media source object corresponding to a processing object of media reproduction by an application executed by the receiving device.

In addition, a fourth aspect of the present disclosure is directed to a data processing method executed by a transmitting device. A communication unit of the transmitting device transmits an application used by a receiving device. The application executes a synthesis process for synthesizing reception data received by the receiving device and application reception data received by the application on the basis of a media source object that discloses a buffering process for the reception data.

Other objects, features, and advantages of the present disclosure will become apparent by further detailed description based on an embodiment of the present disclosure and the accompanying drawings described and depicted below. Note that the system in the present specification refers to a logical collective configuration constituted by a plurality of devices, and includes a set of constituent devices not contained in an identical housing.

Effects of the Invention

Realized according to a configuration of an embodiment of the present disclosure are a device and a method capable of efficiently performing a synthesis process of broadcast reception data and network reception data.

More specifically, for control by an application executed by a receiving device, processing for broadcast reception data received by the receiving device via a communication unit is as a media source object corresponding to a processing object of the application by applying MSE application programming interface (API) of an HTML5 browser, for example. As processing for the media source object, the application sets the media source object of the broadcast reception data as a video object of HTML5 to control image and audio reproduction of the broadcast reception data under the application. The application controls a synthesis process for synthesizing the broadcast reception data and network reception data received via a network by using the media source object of the broadcast reception data. The application obtains a time offset corresponding to a time difference between an application time axis and a broadcast time axis on the basis of an API application process to perform high-accuracy and low-delay control for the data synthesis process.

This configuration achieves low-delay and high-accuracy synthesis process and output process of the broadcast reception data and the network reception data.

Note that advantageous effects described in this specification are presented only by way of example, wherefore other advantageous effects or additional advantageous effects may be offered.

MODES FOR CARRYING OUT THE INVENTION

A receiving device, a transmitting device, and a data processing method according to the present disclosure are hereinafter described with reference to the drawings. Note that the description is presented on the basis of the following items.

1. Configuration Example of Communication System
2. Data Communication Protocol FLUTE and ROUTE
3. Communication Processing Example Executed by Transmitting Device and Receiving Device
4. Service Worker (SW)
5. Synthesis Process of Reception Data Received via Broadcast Wave and Network
6. Embodiment Eliminating or Reducing Delay Produced by Synthesis Process of Reception Data Received via Broadcast Wave and Network
7. Hardware Configuration Example Applied to Data Reception and Synthesis Process by Receiving Device
8. Sequence of Processes Performed by Receiving Device
9. Processing Example Using Service Worker (SW) and Application
10. Configuration Example of Transmitting Device and Receiving Device
11. Summary of Configuration of Present Disclosure

[1. Configuration Example of Communication System]

Figure 1:
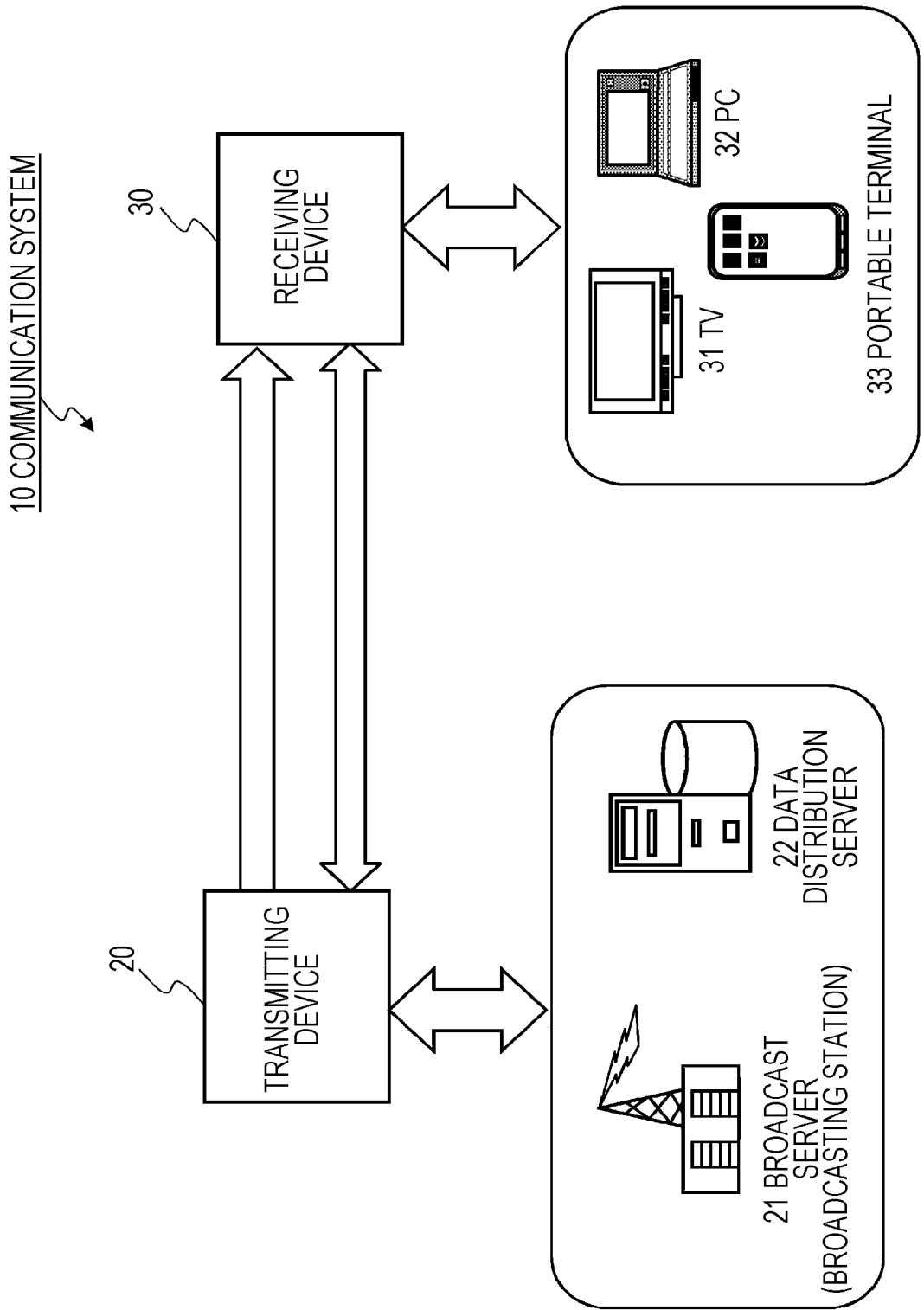
FIG. 1 is a view illustrating a configuration example of a communication system which performs processes according to the present disclosure.

Discussed hereinbelow with reference to FIG. 1 is a configuration example of a communication system which executes processes according to the present disclosure.

As illustrated in FIG. 1, a communication system 10 includes a transmitting device 20 corresponding to a communication device for transmitting content such as image data and audio data, and a receiving device 30 corresponding to a communication device for receiving content transmitted by the transmitting device 20.

More specifically, the transmitting device 20 is a device providing content, such as a broadcasting station 21 and a content server 22.

On the other hand, the receiving device 30 is a client device of a general user. More specifically, the receiving device 30 is constituted by a TV receiver 31, a PC 32, a portable terminal 33 or the like.

Data communication between the transmitting device 20 and the receiving device 30 is achieved by utilizing at least either bidirectional/unidirectional communication via a network such as the Internet, or unidirectional communication via a broadcast wave or the like, or communication via both a network and a broadcast wave.

Content is transmitted from the transmitting device 20 to the receiving device 30 in conformity with MPEG-DASH standards corresponding to standards of an adaptive streaming technology, for example.

The MPEG-DASH standards include following two standards.

(a) standards concerning manifest file (media presentation description (MPD)) for describing metadata corresponding to management information on moving images and audio files
(b) standards concerning file format (segment format) for moving image content transmission Content is distributed from the transmitting device 20 to the receiving device 30 in conformity with the foregoing MPEG-DASH standards.

The transmitting device 20 encodes content data, and generates data files containing encoded data and metadata on the encoded data. Encoding is performed on the basis of an MP4 file format specified under MPEG, for example. Note that a file of encoded data generated by the transmitting device 20 as a data file in the MP4 format is called "mdat". On the other hand, metadata generated by the transmitting device 20 in the MP4 format is called "moov" or "moof", for example.

Examples of content supplied from the transmitting device 20 to the receiving device 30 include music data, movies, TV programs, videos, pictures, documents, image data such as pictures and diagrams, games and software, and other various data.

Transmission data from the transmitting device 20 is now described with reference to FIG. 2.

Figure 2:
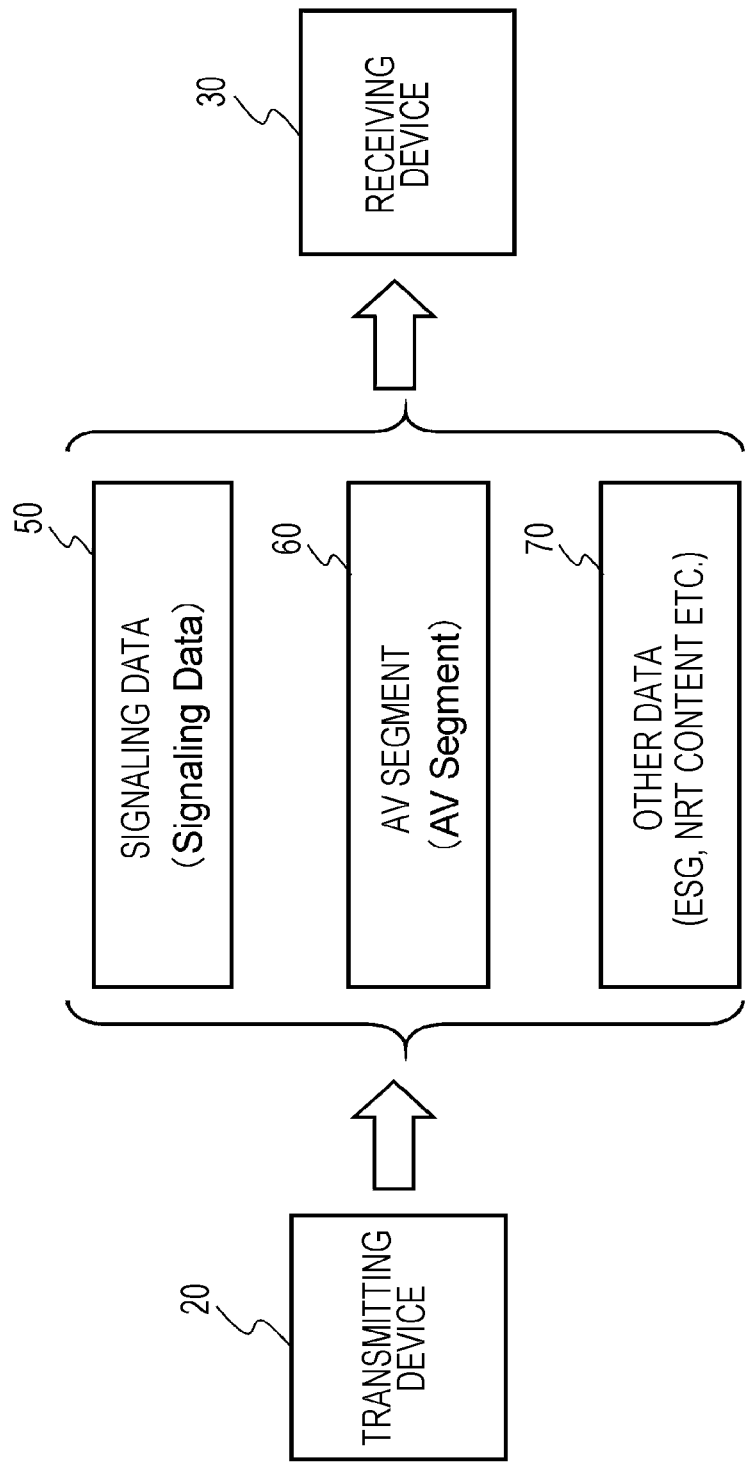
FIG. 2 is a diagram illustrating transmission data from a transmitting device.

As illustrated in FIG. 2, data transmitted by the transmitting device 20 under MPEG-DASH standards is roughly divided into a plurality of types as follows.

(a) signaling data 50
(b) AV segments 60
(c) data 70 other than data 50 and segments 60 (ESG, NRT content and the like)

For example, the AV segments 60 are constituted by images (videos) and audio data reproduced by the receiving device, i.e., program content supplied from a broadcasting station or the like. For example, the AV segments 60 are constituted by MP4 encoded data (mdat) and metadata (moov, moof) described above.

On the other hand, the signaling data 50 is constituted by program schedule information such as a program list, address information necessary for obtaining programs (URL or the like), guidance information constituted by information necessary for a reproduction process of content, such as codec information (encoding system or the like), and control information.

Reception of the signaling data 50 by the receiving device 30 is needed before reception of the AV segments 60 containing program content corresponding to a reproduction target.

The signaling data 50 is transmitted as data inextensible markup language (XML) format data, for example, to the receiving device (client) corresponding to a user terminal such as a smartphone and a TV receiver.

As described above, the signaling data is repeatedly transmitted as required. For example, the signaling data is frequently and repeatedly transmitted per 100 msec., for example.

This transmission allows the receiving device (client) to immediately obtain signaling data at any time.

The client (receiving device) is allowed to perform processes necessary for reception and reproduction of program content without delay, such as processes for obtaining a necessary access address of program content, and setting codec.

The data 70 other than the data 50 and the segments 60 contains electronic service guide (ESG), NRT content and the like, for example.

The ESG is an electronic service guide corresponding to guidance information such as a program list, for example.

The NRT content is non-real-time content.

The NRT content contains various types of application files, and data files such as moving images and still images, for example, executed by the browser of the receiving device 30 as a client.

The NRT content also contains a service worker used as a control program for applications or the like as described below.

Following data illustrated in FIG. 2, i.e., the signaling data 50 (*a*), the AV segments 60 (*b*), and the data 70 (*c*) other than the data 50 and the segments 60 (ESG, NRT content and the like) are transmitted under a data communication protocol of file delivery over uni-directional transport (FLUTE), for example.

[2. Data Communication Protocol FLUTE and ROUTE]

The data communication protocol of file delivery over uni-directional transport (FLUTE) is a protocol for session management of content transmitted by multicast.

For example, a file generated by the server corresponding to the transmitting device (distinguished from URL on the basis of version) is transmitted to the client corresponding to the receiving device under the FLUTE protocol.

The receiving device (client) 30 accumulates received files in association with URLs and versions in a storage unit (client cache) of the receiving device (client) 30, for example.

Files in the same URL but different versions are regarded as files of which contents have been updated. The FLUTE protocol is a protocol performing only unidirectional file transfer control, and does not have a selective filtering function for files on the client side. However, the FLUTE protocol is capable of achieving selective filtering, and constituting and update-managing local caches reflecting preferences of the user by selecting files transmitted under control by FLUTE on the client side on the basis of metadata associated with the files.

Note that the metadata may be either extended and incorporated into the FLUTE protocol, or described separately in electronic service guide (ESG) or other protocols.

Note that, originally, FLUTE was specified as a file transfer protocol in multicast. FLUTE is constituted by a combination of FDT, and a multicast protocol of a scalable file object called ALC, more specifically, LCT or FEC components corresponding to building blocks of the multicast protocol.

Conventional FLUTE was developed chiefly for the purpose of non-synchronous file transfer. However, extension of FLUTE has been currently attempted by advanced television system committee (ATSC) corresponding to a standards body concerning data distribution systems via broadcast waves and networks to facilitate further application of FLUTE to broadcast live streaming. This extended specification of FLUTE is called real-time object delivery over unidirectional transport (ROUTE).

Advanced television system committee (ATSC) 3.0 is an example of standards concerning data distribution systems via broadcast waves and networks, as standards of which standardization has been currently attempted. This ATSC 3.0 replaces conventional FLUTE protocol with ROUTE, and specifies stack configuration adopted for transmission of signaling data, ESG, non-synchronous files, synchronous streams, and others.

[3. Communication Processing Example Executed by Transmitting Device and Receiving Device]

A communication processing example executed by the transmitting device and the receiving device is hereinafter described.

Figure 3:
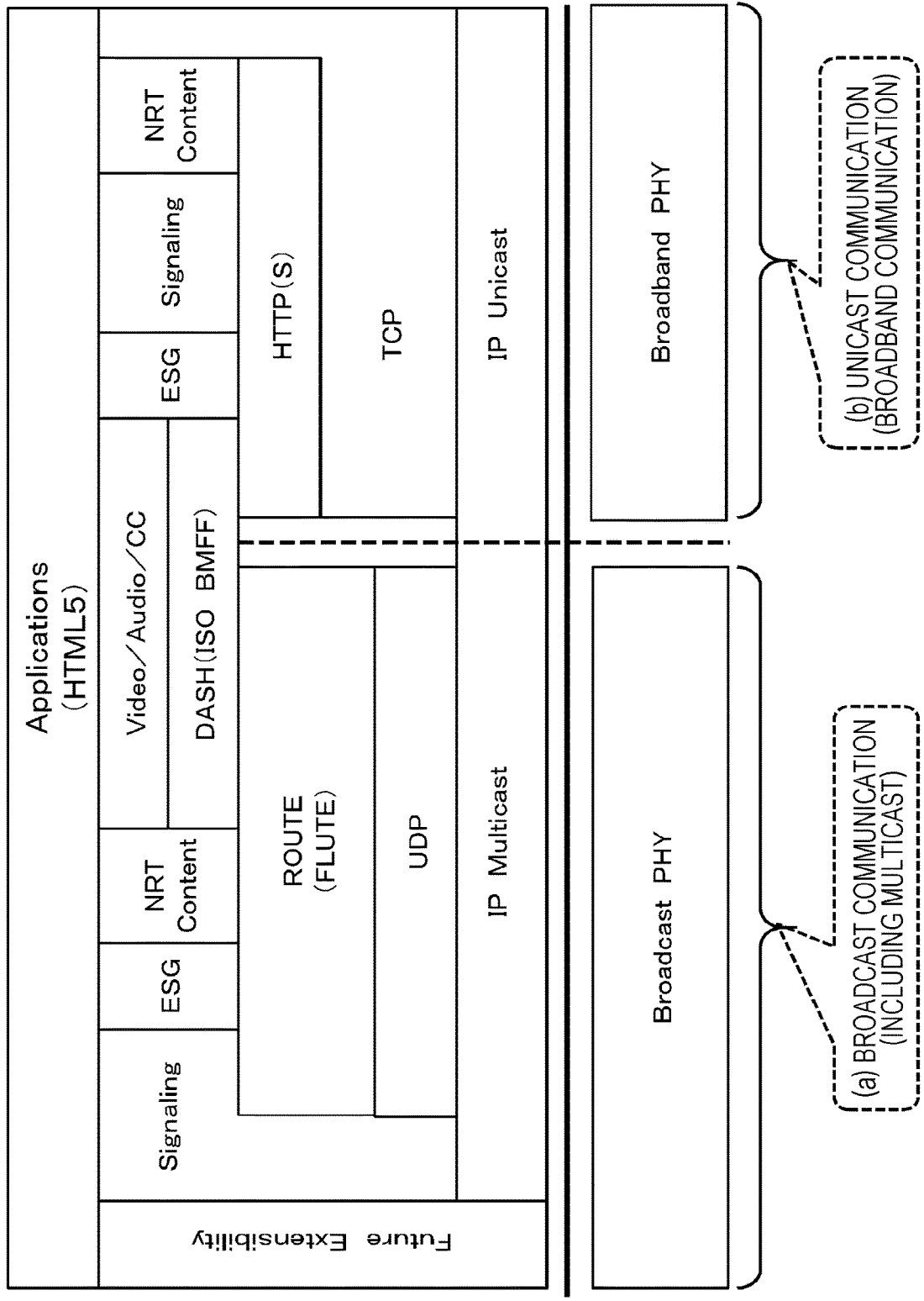
FIG. 3 is a diagram illustrating an example of protocol stacks of the transmitting device and a receiving device.

FIG. 3 is a diagram illustrating an example of protocol stacks of the transmitting device and the receiving device.

The example illustrated in FIG. 3 includes two protocol stacks for processing following two types of communication data.

(a) broadcast (including multicast) communication (such as broadcast data distribution)
(b) unicast (broadband) communication (such as HTTP client-server communication)

The left part of FIG. 3 represents to a protocol stack corresponding to the broadcast communication (a) (such as broadcast data distribution).

The right part of FIG. 3 represents a protocol stack corresponding to the unicast (broadband) communication (b) (such as HTTP client-server communication).

The protocol stack corresponding to the broadcast communication (a) (such as broadcast data distribution) illustrated in the left part of FIG. 3 includes layers presented below in the order from the lowest layer.

(1) broadcast physical layer (Broadcast PHY)
(2) IP multicast layer (IP Multicast)
(3) UDP layer
(4) ROUTE (extended FLUTE) layer
(5) ESG, NRT content, DASH (ISO BMFF) and Video/Audio/CC
(6) Application Layer (Applications (HTML5))

Note that a signaling layer is provided as an upper layer of the IP multicast layer (IP Multicast) (2).

The signaling layer is a layer applied to transmission and reception of the signaling data 50 described above with reference to FIG. 2. The signaling data contains program schedule information such as a program list, address information necessary for obtaining programs (URL or the like), guidance information constituted by information necessary for a reproduction process of content, such as codec information (encoding system or the like), and control information.

Note that a layer allowing use of a future protocol (Future Extensibility) is provided as an upper layer of the broadcast physical layer (Broadcast PHY) (1).

The broadcast physical layer (Broadcast PHY) (1) is a physical layer constituted by a communication control unit which controls a communication unit of a broadcast system, for example, for performing broadcast communication.

The IP multicast layer (IP Multicast) (2) is a layer which performs a data transmission and reception process based on IP multicast.

The UDP layer (3) is a layer for a generation and analysis process of UDP packets.

The ROUTE layer (4) is a layer which stores or extracts transfer data under ROUTE protocol corresponding an extended FLUTE protocol.

In this case, ROUTE is a multicast protocol of a scalable file object called ALC similarly to FLUTE. More specifically, FLUTE is constituted by a combination of LCT and FEC components corresponding to building blocks of the multicast protocol.

The ESG, NRT content, DASH (ISO BMFF) and Video/Audio/CC (5) is data transferred under ROUTE protocol.

A broadcast distribution service under DASH standards is called multimedia broadcast multicast service (MBMS). In addition, evolved multimedia broadcast multicast service (eMBMS) is a system which efficiently realizes this MBMS in LTE.

Each of MBMS and eMBMS is a broadcast distribution service for simultaneously distributing identical data, such as movie content, via a common bearer to a plurality of user terminals (UEs) corresponding to receiving devices located within a specific area. Broadcast distribution based on MBMS and eMBMS realizes supply of the same content to receiving devices located in a distribution service providing area, such as a number of smartphones, PCs, and TV receivers.

Each of MBMS and eMBMS specifies a process for downloading files in 3GPP file format (ISO-BMFF file, MP4 file) under transfer protocol ROUTE or FLUTE.

A major part of the following data described with reference to FIG. 2, i.e., the signaling data 50 (a), the AV segments 60 (b), and the data 70 (c) other than the data 50 and the segments 60 (ESG, NTR content) is transmitted under ROUTE protocol or FLUTE protocol.

The ESG, NRT content, DASH (ISO BMFF) and Video/Audio/CC (5) is data transferred under ROUTE protocol.

The ESG is an electronic service guide corresponding to guidance information such as a program list, for example.

NRT content is non-real-time content.

As described above, NRT content contains various application files, and data files of moving images and still images, and others executed by the browser of the receiving device corresponding to the client, for example. NRT content further contains a service worker (SW) used as a control program for applications or the like as described below.

Video/Audio/CC is actual data corresponding to a reproduction target, such as video data and audio data distributed in conformity with DASH standards.

The application layer (Applications (HTML5)) (6) is an application layer which executes generation or analysis of data transferred under ROUTE protocol, output control of various data, and others. For example, (6) the application layer performs processes for generation, analysis, and output of data under HTML5.

On the other hand, the protocol stack shown on the right side of FIG. 3 and corresponding to the unicast (broadband) communication (b) (such as HTTP type P2P communication) includes layers presented below in the following order from the lowest layer.

(1) broadband physical layer (Broadband PHY)
(2) IP unicast layer (IP unicast)
(3) TCP layer
(4) HTTP layer
(5) ESG, Signaling, NRT content, DASH (ISO BMFF) and Video/Audio/CC
(6) Application Layer (Applications (HTML5))

The broadband physical layer (Broadband PHY) (1) is a physical layer constituted by a communication control unit, such as a device driver, which controls a communication unit of a network card for performing broadband communication.

The IP unicast layer (IP Unicast) (2) is a layer which performs an IP unicast transmission and reception process.

The HTTP layer (3) is a layer performing a generation and analysis process of HTTP packets.

The higher layers of this stack are similar to the corresponding layers of the stack configuration of the broadcast communication (a) (such as broadcast data distribution) shown on the left side of FIG. 3.

Note that each of the transmitting device (server) 20 and the receiving device (client) 30 performs two processing systems illustrated in FIG. 3, that is, processes based on at least either one of the two communication protocol stacks of the broadcast communication (a) (such as broadcast data distribution) and the unicast (broadband) communication (b) (such as HTTP type P2P communication).

According to the protocol stacks illustrated in FIG. 3, attributes of file groups (including URL as identifiers of files) multicast-transferred under ROUTE (FLUTE) may be described either within a control file of ROUTE (FLUTE), or within signaling data describing a file transfer session. In addition, more detailed attributes of a file transfer session may be described in ESG (also applicable to presentation to end user).

[4. Service Worker (SW)]

A service worker (SW) supplied by the transmitting device (server) 20, and chiefly used by the receiving device (client) 30 is hereinafter described.

The service worker (SW) is supplied from the transmitting device 20 such as a broadcast server 21 and a data distribution server 22 to the receiving device.

The service worker (SW) is a program which executes applications (i.e., application programs) executed by the receiving device (client) 30, a process for obtaining data files used at the time of execution of applications, a storage process for a storage unit (cache), an update process, a deletion process and the like. More specifically, the service worker (SW) is constituted by JavaScript (registered trademark), for example.

The service worker (SW) is set in correspondence with broadcast programs (broadcast content) supplied from the transmitting device 20 such as the broadcast server 21 and the data distribution server 22, and supplied from the transmitting device 20 to the receiving device 30 as a control and management program for applications supplied from the transmitting device 20 to the receiving device 30.

The service worker (SW), applications, and data files used at the time of execution of applications are supplied from the transmitting device 20 to the receiving device 30 as NRT content (non-real-time content) described above with reference to FIGS. 2 and 3.

Alternatively, a data providing server different from the server distributing broadcast programs may supply the service worker (SW), applications, and data files used at the time of execution of applications to the receiving device 30.

The service worker (SW) performs a process of resource management (obtainment, retention, update, deletion etc.) of applications executing information display by using a browser corresponding to a program for browsing web pages or the like on the receiving device 30 side, for example.

Specific examples (use cases) of processes using the service worker (SW) are now described with reference to FIGS. 4 and 5.

Figure 4:
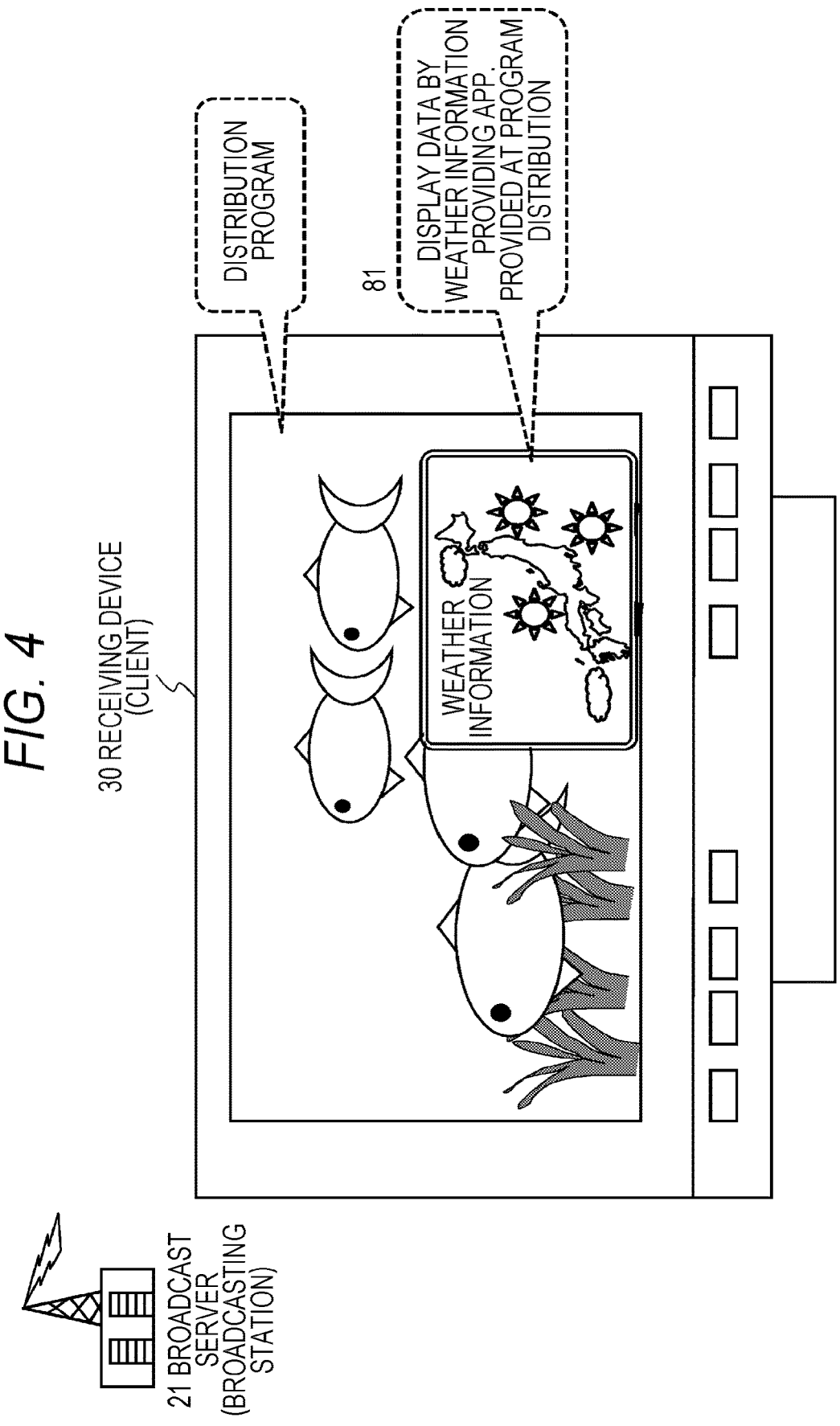
FIG. 4 is a view illustrating a specific example (use case) of processing using a service worker (SW).

FIG. 4 illustrates a state of the receiving device 30 receiving certain program content from the transmitting device 20 such as the broadcast server 21, and displaying the program content on a display unit of the receiving device 30.

The transmitting device 20 such as the broadcast server 21 supplies an application for displaying weather information, and various data files used for this weather information display application, such as data files containing moving images, still images, audio data, and other various types of data, as NRT content (non-real-time content) to the receiving device 30 along with program distribution.

These applications and data files are hereinafter referred to as "resources".

The broadcast server 21 further supplies the service worker (SW) as a resource management program for managing these "resources" to the receiving device 30 similarly as NRT content (non-real-time content).

The receiving device 30 is capable of displaying weather information as illustrated in FIG. 4 along with program display by using the "resources" received from the transmitting device 20, i.e., the applications and data files.

According to this conventional data distribution configuration, data display by the application is discontinued after an end of the program supplying the application.

More specifically, resources such as a weather information display application are stored in a temporary storage cache, for example, to come into an available state on the receiving device 30 side during reception of a program.

However, after an end of the program, or switching of channels by the user, these sets of cache data are deleted, or set to a non-accessible state.

The service worker (SW) functions as a resource management program which allows use of applications and data associated with programs even after an end of programs or switching of channels, or in an offline state such as a non-receiving state of broadcast and a network disconnection state.

Figure 5:
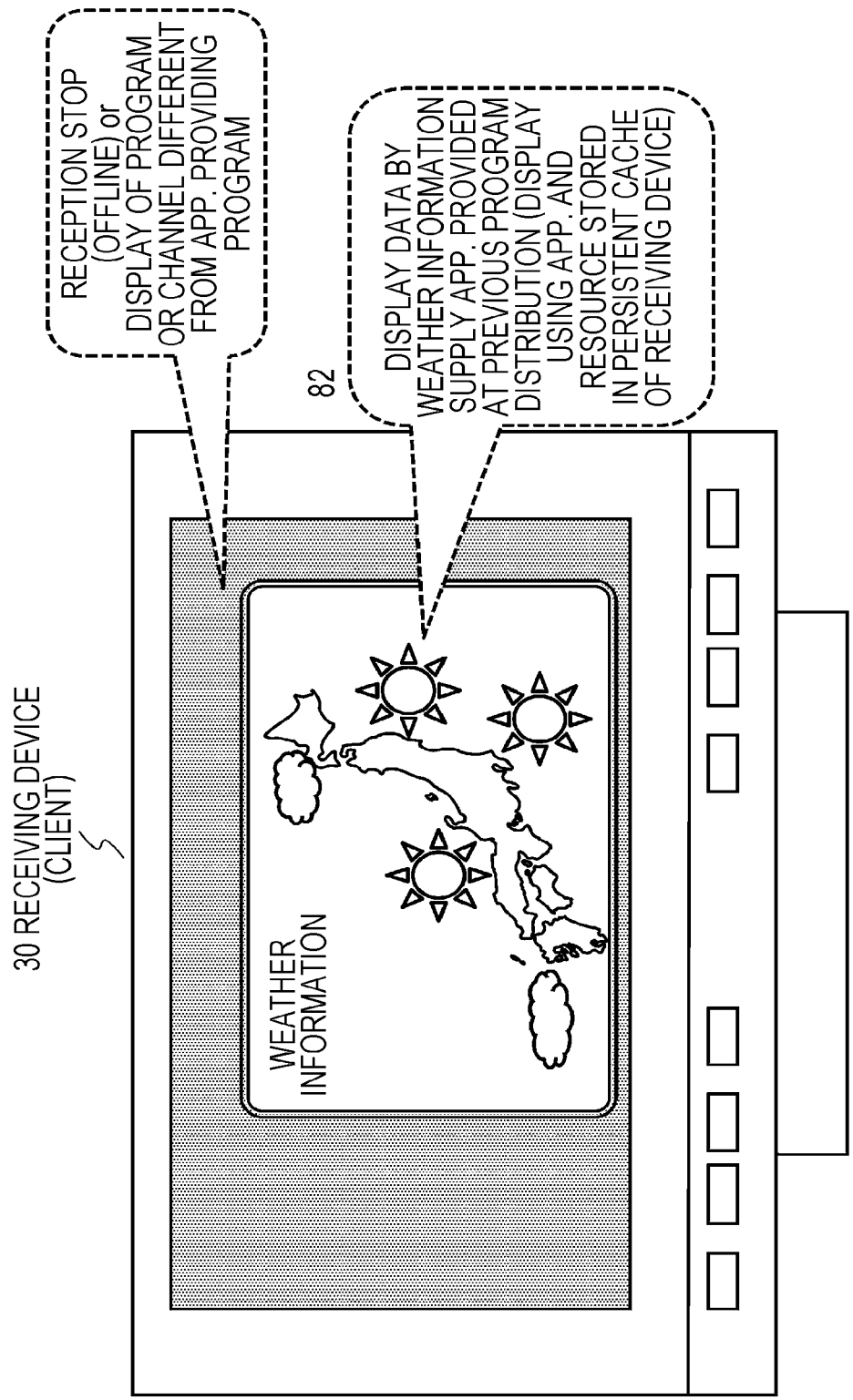
FIG. 5 is a view illustrating a specific example (use case) of processing using the service worker (SW).

As illustrated in FIG. 5, use of the weather information display app. is allowed even after an end of the program providing this application or switching to another channel, or even in an offline state not receiving data. In other words, display and browse of weather information is allowed on the display unit of the receiving device 30.

Note that the weather information display application is a program displayed by a browser, for example.

The weather information display application is stored in a storage unit (persistent cache) of the receiving device 30 under control by the service worker (SW). At the time of issue of a request (event) such as a display request from the user, for example, the weather information display application is read from the storage unit (persistent cache) under control by the service worker (SW), and displayed on the display unit.

Note that the storage unit (persistent cache) storing resources such as applications is preferably constituted by a non-volatile memory of which stored data is not deleted even after the receiving device 30 is turned off.

Accordingly, the service worker (SW) allows use of various applications associated with programs regardless of display or non-display of programs.

Note that the service worker (SW) is provided for each of resources (application and app-associated data) corresponding to a certain program, for example, and is supplied from the transmitting device 20 to the receiving device 30 together with the corresponding resource, or before or after transmission of the corresponding resource.

The service worker (SW) may be provided for each of programs, or may be provided in common for resources corresponding to a particular channel including a plurality of programs.

The service worker (SW) and resources (applications and app-associated data) managed by the service worker (SW) are stored in the storage unit (persistent cache) of the receiving device 30.

Figure 6:
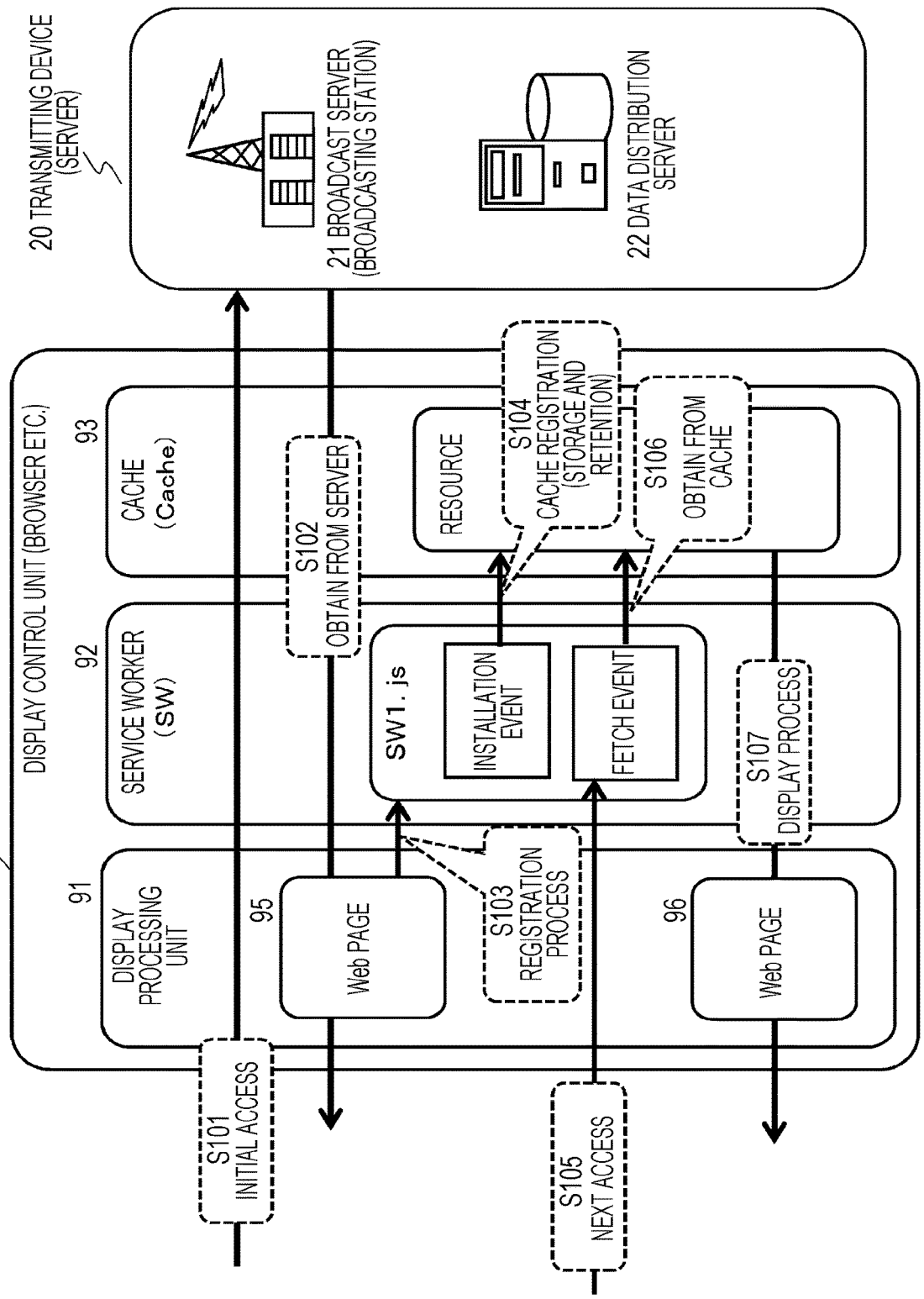
FIG. 6 is a diagram illustrating an example of processing using the service worker (SW).

FIG. 6 is a diagram illustrating an example of processing performed by using the service worker (SW).

FIG. 6 illustrates an example of a sequence performed by the receiving device 30 to obtain a web page corresponding to a resource (such as weather information display page illustrated in FIGS. 4 and 5) from the transmitting device 20, and store the web page in the storage unit (persistent cache) of the receiving device 30 for use of the web page.

Note that the web page is displayed by using a resource constituted by predetermined web page display application and display data.

FIG. 6 illustrates a display processing unit 91, a service worker (SW) 92, and a cache (storage unit) 93 as constituent elements of a display control unit 90 of the receiving device.

Steps S101 and S102 are processes performed by the receiving device 30 as an initial access to the transmitting device 20 to obtain a resource (web page).

This resource is obtained from NRT content transmitted by a broadcast server or the like, for example.

After the obtaining process, the display processing unit 91 displays a web page 95 on the display unit of the receiving device 30. This display shows the web page together with a program providing the web page, and corresponds to the display state described above with reference to FIG. 3.

When a request of registration (installation) of the resource (web page) is issued as an instruction from the user during this display period, the service worker (SW) 92 initiates a registration (installation) process of the resource (web page) in step S103.

More specifically, the service worker (SW) 92 performs a process for passing the resource to the cache 93, and storing the resource in the storage unit (persistent cache) as shown in step S104.

Thereafter, the user issues a request for browsing the web page after an end of the program or switching to another channel, or in an offline setting state in step S105.

The service worker (SW) 92 detects input of this browse request as a fetch event, and obtains the resource (web page) from the storage unit (persistent cache) in response to fetch event detection in step S106.

The display processing unit 91 displays a web page 96 in step S107.

This web page display process is a display process performed after the end of the program or switching to another channel, or in the offline setting state, and corresponds to the display state described above with reference to FIG. 5.

The service worker (SW) therefore allows use of various types of applications associated with programs regardless of display and non-display of the programs, and achieves processing such as display of web pages set as display information belonging to corresponding programs at arbitrary timing regardless of the programs, for example.

Accordingly, the service worker (SW) performs resource management such as obtainment, storage, update, and deletion of resources constituted by applications containing constituent elements such as web pages, HTML pages, and JavaScript (registered trademark), data used by applications, and others.

Storage or cache of resources is persistent cache which stores data even in a non-operation state of applications, unlike ordinary local/temporary cache.

In a specific concept, a certain type of proxy server is included in a browser corresponding to a web page display program. Accordingly, a web page is obtained and displayed by an access to the proxy server (persistent cache) at an arbitrary time as necessary.

Note that the service worker (SW) is also stored (installed) in the persistent cache. After the service worker (SW) is installed in the receiving device, various controls are achievable for resources corresponding to management targets of the service worker (SW).

For example, the service worker (SW) starts processing and provides a resource from the persistent cache in response to an access request to the resource (resource fetch request) before a start of processing on the browser side (obtainment of resource from local cache or network).

In addition, various procedures may be set for the service worker (SW) provided in JavaScript (registered trademark). In this case, flexible processing description is allowed for cache control such as update of a part of a resource in the persistent cache.

Note that update of the service worker (SW) is also allowed. The service worker (SW) is provided from the transmitting device 20. In this case, various types of information necessary for updating, such as updating date information and update data access information, are recorded in header information (HTTP Cache-Control) on the service worker (SW). Updating is executed on the basis of this header information.

For example, when an expiration date approaches on the basis of an expiration date set for a header, the receiving device 30 performs an update process for obtaining a service worker (SW) of a new version and replacing the SW of the previous version stored in the cache.

[5. Synthesis Process of Reception Data Received Via Broadcast Wave and Network]

The receiving device 30 is capable of receiving program content from the broadcast server 21 corresponding to the transmitting device via a broadcast wave, and also receiving various types of content from the data distribution server 22 via a network. The receiving device 30 is capable of synthesizing data received via these two communication channels, and displaying the synthesized data.

For example, the receiving device 30 is capable of performing a process for synthesizing data received via the two communication channels by adopting an application executed by the receiving device 30, such as a management application for the service worker (SW) described above, for example.

For example, the application performs a process for synthesizing and displaying two types of data: (a) program content received via a broadcast wave; and (b) advertisement content received via a network.

A specific processing example is now described with reference to FIGS. 7 and 8.

Figure 7:
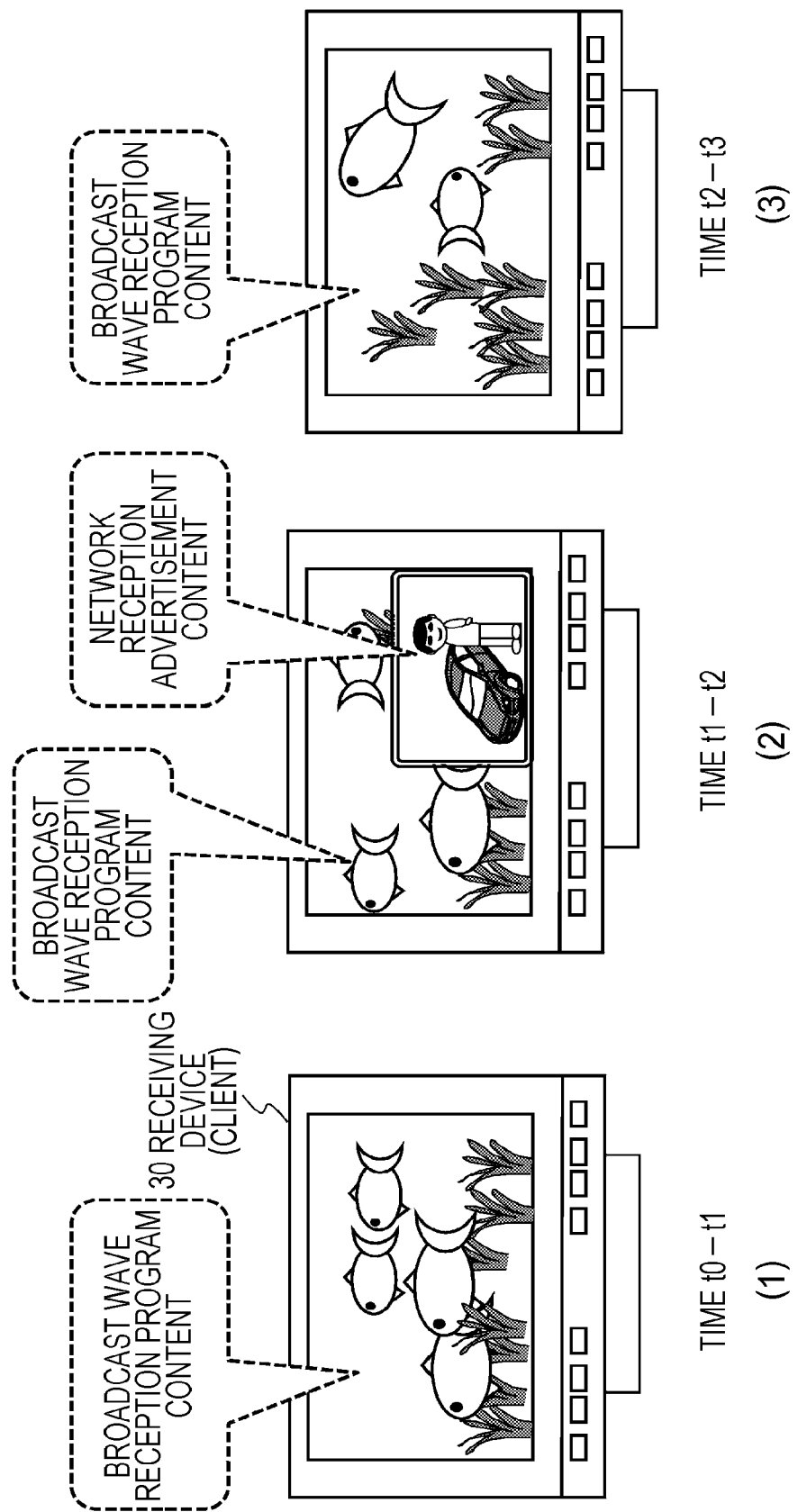
FIG. 7 is a view illustrating an example of a synthesis display process of broadcast reception content and network reception content.

FIG. 7 illustrates transitions of data displayed on the display unit of the receiving device (client) 30 with an elapse of time.

(1) In a period from t0 to t1, program content received via a broadcast wave is displayed.
(2) In a period from t1 to t2, advertisement content received via a network is superimposed on the program contents received via the broadcast wave
(3) In a period from t2 to t3, the program content received via the broadcast wave is displayed.

Advertisement content received via the network in (2) the period from t1 to t2 is supplied to the user as advertisement content (target advertisement) targeted to a particular region or particular users, for example.

The advertisement content received by the receiving device 30 via the network in (2) the period from t1 to t2 is content receivable during execution of an application by the receiving device 30.

The receiving device not executing the application displays only data received via the broadcast wave.

The configuration illustrated in FIG. 7 is an example which displays data received via the network together with data received via the broadcast wave (parallel display) in the period from t1 to t2. This configuration requires a plurality of video image decoding devices to superimpose advertisement content on program content and reproduce both the contents.

Alternatively, the receiving device 30 may perform such a processing mode of an application which completely replaces data received via a broadcasting wave in a partial period with network reception data, rather than parallel display of two types of data. In this case, reproduction is realizable only by a single video image decoding device.

Figure 8:
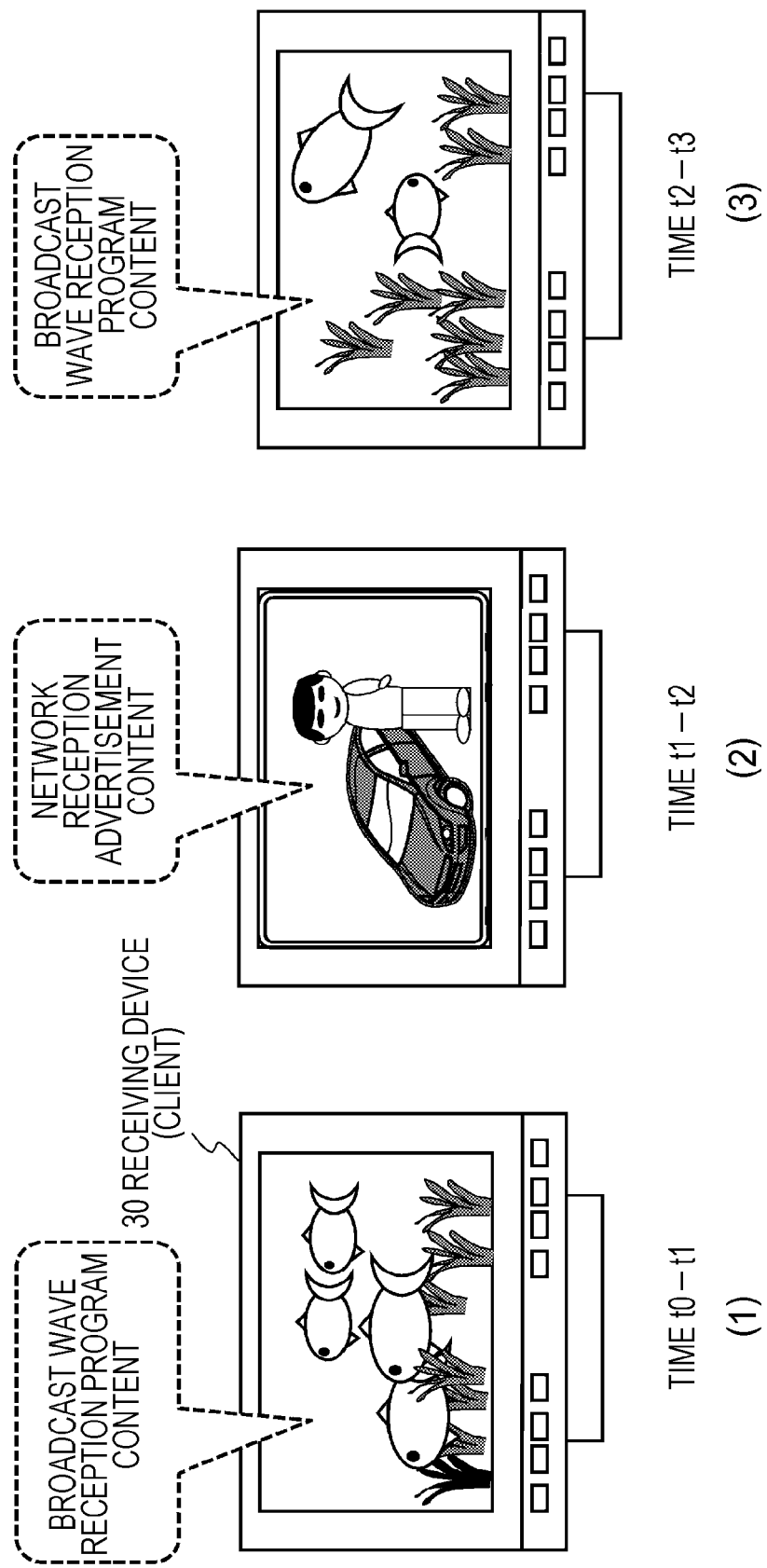
FIG. 8 is a view illustrating an example of the synthesis display process of broadcast reception content and network reception content.

FIG. 8 illustrates an example of this replacement display.
(1) In a period from t0 to t1, program content received via a broadcast wave is displayed.
(2) In a period from t1 to t2, advertisement content received via a network is displayed.
(3) In a period from t2 to t3, the program content received via the broadcast wave is displayed.

Advertisement content received via the network in (2) the period from t1 to t2 is supplied to the user as advertisement content (target advertisement) targeted to a particular region or particular users, for example.

Advertisement content received by the receiving device 30 via the network in (2) the period from t1 to t2 is content receivable during execution of an application by the receiving device 30.

The receiving device not executing the application may receive and display advertisement content received via a broadcast wave for an unspecified majority in the period from t1 to t2.

As described above, a synthesis display process of both broadcast reception data and network reception data is achievable by processing of an application.

However, when a processing time of the synthesis process of the broadcast reception data and the network reception data becomes longer, a reproduction delay may be produced.

Particularly when a time is required for the synthesis process which replaces the broadcast reception data with the network reception data for display as illustrated in FIG. 8, for example, a break of images without display of an advertisement may be caused at the time t1 shown in FIG. 8.

This problem is hereinafter detailed.

Discussed before touching upon this problem is an adaptive streaming process which selects and reproduces segments at an optimal bitrate on the client side in accordance with a network status.

As described above, data reception at a constant bitrate may become difficult in data transmission via a network due to congestion of the network or for other reasons.

For solving this problem, there has been proposed adaptive streaming which transmits segments corresponding to segmented files of data at a plurality of bitrates to a network, and allows selection and reproduction of segments at an optimal bitrate on the client side in accordance with a network status.

The receiving device 30 is configured to output not only network reception data but also broadcast reception data selected and obtained at an optimal bitrate for a network status and resolution information of the earthquake display device.

Note that the receiving device 30 is capable of obtaining information on a bit rate of transmitted data on the basis of a manifest file provided by the transmitting device 20.

Figure 9:
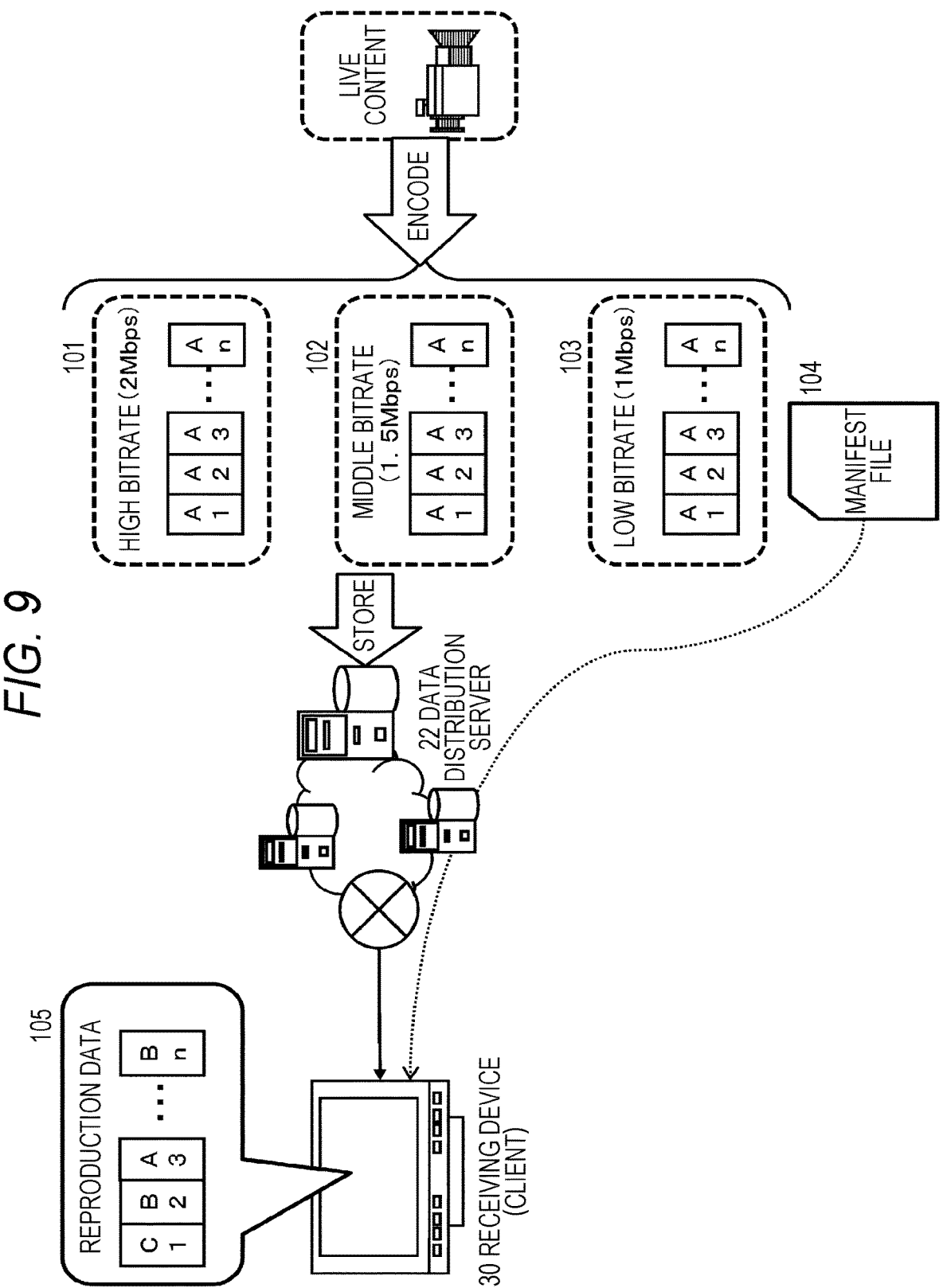
FIG. 9 is a view illustrating adaptive streaming.

FIG. 9 is a view illustrating adaptive streaming.

The data distribution server 22 prepares data at a plurality of different bitrates as distribution data beforehand when distributing content constituted by live video images, for example. According to the example illustrated in the figure, distribution data contains high bitrate (2 Mbps) data 101, a middle bitrate (1.5 Mbps) data 102, and low bitrate (1 Mbps) data 103.

These sets of data are supplied to the receiving device 30 via a network in units of segment corresponding to segmented data. Each of A1 through An, B1 through Bn, and C1 through Cn corresponds to segment data.

The respective sets of data A1, B1, and C1 indicate the same scene, and are configured as data (segment) at different bitrates.

Each of the segments is a segment containing data decodable in units of one segment, such as an MP4 file.

Furthermore, a manifest file 104 describing attribute information and URL of the segments is supplied to the receiving device 30 via the network.

The receiving device (client) 30 obtains the manifest file 104 from the server, selects optimal bitrate data (segment) based on the size of the display unit of the receiving device 30 and an available communication band, and receives and reproduces the selected data. A dynamic change of a bitrate is allowed in accordance with a change of a network band. In this case, the client is capable of receiving optimal data in accordance with situations by switching data, wherefore reproduction of moving image content is realizable while reducing a break of video images.

Reproduction data 105 illustrated in the figure corresponds to reproduction data reproduced by the receiving device 30. A mixture of data (segments) at various bitrates is reproduced.

For example, the advertisement content described with reference to FIGS. 7 and 8 is constituted by a combination of segment data of this type.

Figure 10:
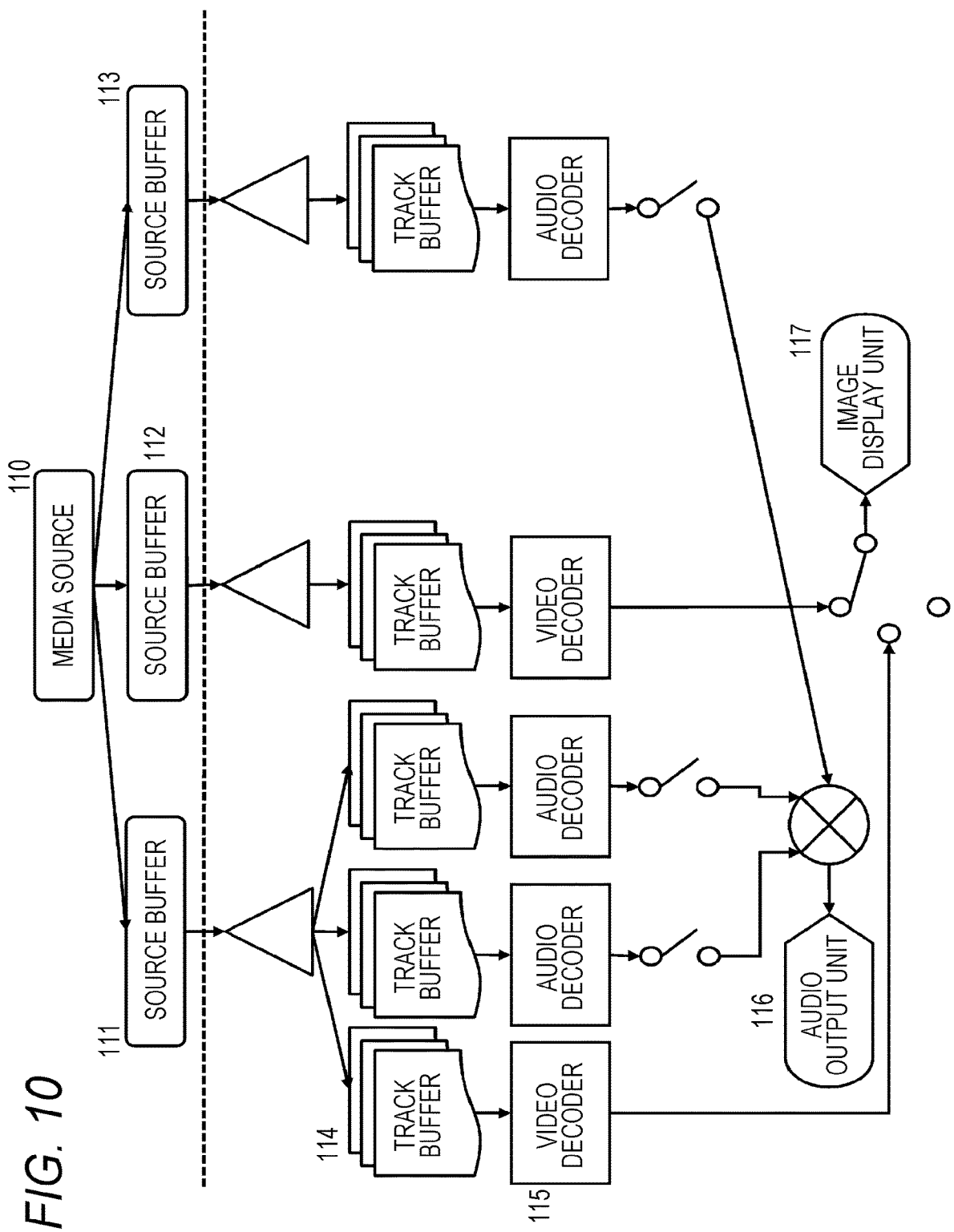
FIG. 10 is a diagram illustrating a processing configuration example of the receiving device which receives and reproduces segments at various bitrates under adaptive streaming.

FIG. 10 is a diagram illustrating a processing configuration example of the receiving device 30 which receives and reproduces segments at various bitrates under adaptive streaming.

The configuration illustrated in FIG. 10 is a processing configuration of media source extensions (MSE)—application programming interface (API) provided as API for a browser executed by the receiving device 30, for example.

A media source 110 is an object indicating reproduction target data received from an external server, for example. This object contains segment data at a plurality of bitrates.

Note that the object in this context refers to an element that can be processed or accessed by an application. For example, data received by the receiving device 30, data stored in the storage unit, or hardware such as the storage unit and the communication unit of the receiving device are elements set as objects.

The media source 110 corresponds to video data or audio data stored in the storage unit of the receiving device 30, for example.

The MSE-API divides the media source 110 in units of data (segment) at each of bitrates, and sets individual source buffers 111 through 113.

Each of the individual source buffers 111 through 113 is a constituent element of the media source 110, and corresponds to an object as a processing target for an application.

The source buffer 111 is a source buffer of data containing respective segments of video data and 2ch audio data.

The source buffer 112 is a source buffer which stores only video data, while the source buffer 113 is a source buffer which stores only audio data.

Each set of the data is divided into respective track buffers 114 having synchronous reproduction time, and decoded by individual video and audio decoders 115, thereafter output to an image output unit 117 and an audio output unit 116.

Note that any one of video decoding results is output to the image output unit 117, and that anyone of audio decoding results is output to the audio output unit 116.

The receiving device (client) 30 may determine which of the decoding results, i.e., which of the bitrate data is selected and output on the basis of a network status and an output unit function of the receiving device, for example.

Accordingly, the receiving device is capable of outputting data appropriately selected from sets of data at various bitrates received via a network.

However, when an application used herein requires a time for a process of synthesizing network reception data and broadcast wave by using MSE API and outputting a synthesis image, a delay of output of the synthesis image may be produced.

Followings are possible specific factors for the delay.

(A) Factor for Reproduction Delay in Live Broadcast

An application executing a synthesis process reads a broadcast stream transmitted via a broadcast wave in units of segment by using XHR (XMLHttpRequest). A read segment is appended to a source buffer as an object assuming a storage area for a segment received via a network as described with reference to FIG. 10. A series of these processes produces a delay.

(B) Delay at Program Switching and Channel Switching

An application executing a synthesis process is set in units of program or in units of channel, wherefore switching of an application is required at the time of switching of programs or channels. This switching process produces a delay, or problems causing a stationary state of video images and insertion of black images as a result of discontinuation of reproduction.

Accordingly, the problems described above may be produced when an application synthesizes reception data via a network with broadcast wave, and outputs the synthesized data.

Figure 11:
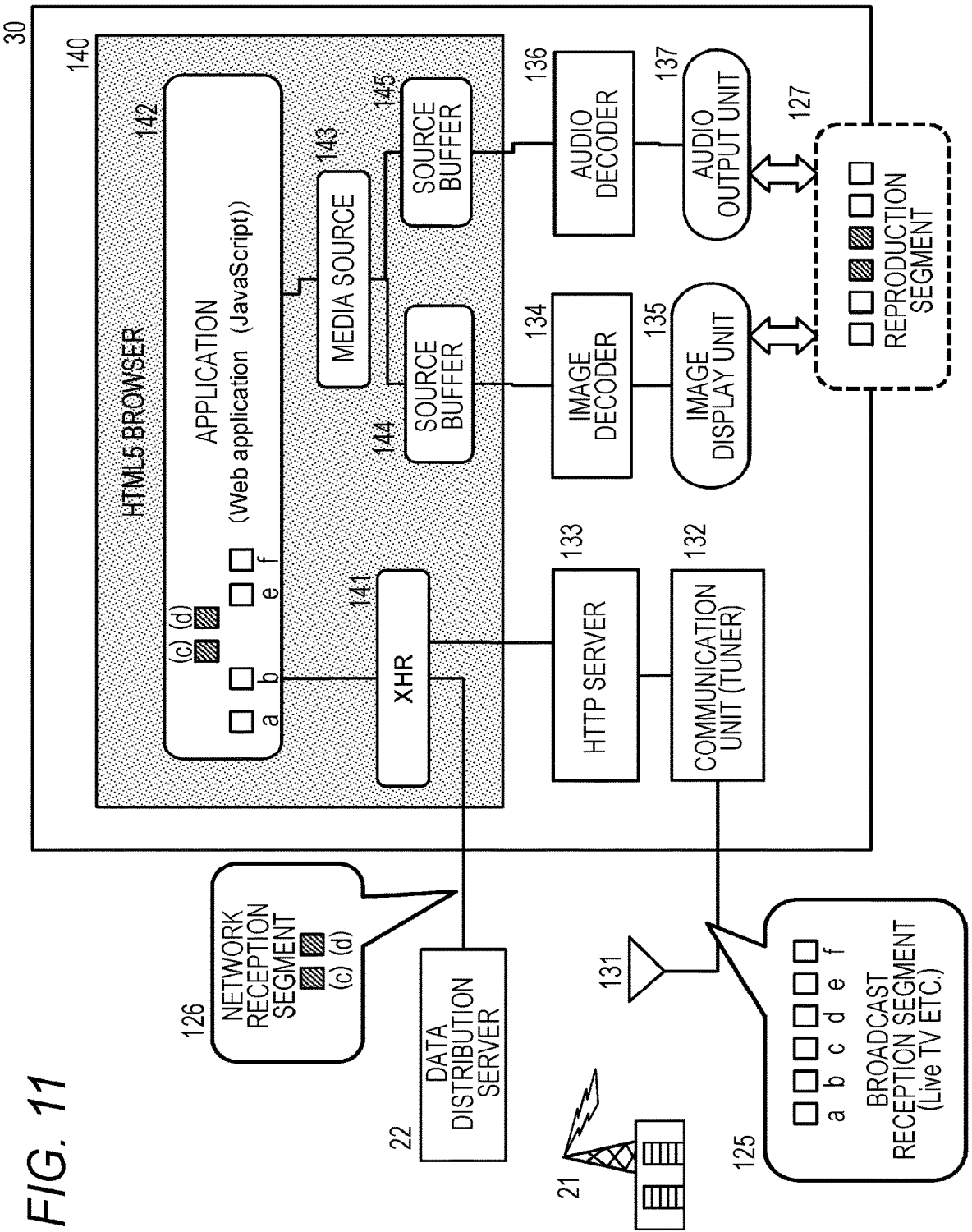
FIG. 11 is a diagram illustrating a process for synthesizing and outputting reception data received via two paths, i.e., a broadcast wave and a network, and showing delay factors.

A process for synthesizing data received via two channels of a broadcast wave and a network, and delay factors are now descried with reference to FIG. 11.

Note that, discussed herein below is a processing example which replaces a part of broadcast wave reception data with network reception data, and outputs the resultant data. More specifically, discussed is a processing example which replaces broadcast reception data in a partial period with network reception data, and outputs the resultant data as described with reference to FIG. 8.

FIG. 11 is a diagram illustrating a synthesis process performed by the receiving device (client) 30, i.e., a process for replacing a part of broadcast reception data with network reception data, and outputs the resultant data.

The receiving device (client) 30 receives a broadcast wave from the broadcast server 21 via an antenna 131.

The receiving device (client) 30 further receives data from the data distribution server 22.

It is assumed that data received via the antenna 131 is broadcast reception segment 125, and that data received from the data distribution server 22 is network reception segment 126.

It is assumed that the broadcast reception segment 125 is program content such as a movie, and that the network reception segment 126 is advertisement content displayed at predetermined timing in the program content.

The example illustrated in the figure shows six partial segments a, b, c, d, e, and f of the broadcast reception segment 125.

On the other hand, the example illustrated in the figure shows two segments (c) and (d) of the network reception segment 126.

Note that each segment is MPEG-compressed data (MP4 data), for example, decodable in units of segment.

Data replacement is performed in units of segment.

the two advertisement segments (c) and (d) of the network reception segment are output in place of the segments c and d of the segments a, b, c, d, e, and f contained in the broadcast reception segment 125.

In other words, output content from the receiving device 30 is constituted by a following segment series.

a, b, (c), (d), e, f

The segments a, b, e, and f of the above segment series are broadcast reception segments, while the segments (c) and (d) are network reception segments.

The receiving device 30 includes a browser (HTML5 browser) 140, and executes an application (web application (JavaScript (registered trademark)) 142 by using the browser 140.

An application 142 executes a synthesis process for synthesizing the broadcast reception segment 125 and the network reception segment 126 based on a process utilizing API (MSE-API previously discussed with reference to FIG. 10), for example.

The broadcast reception segment 125 is temporarily stored in an HTTP server 133 corresponding to a proxy server included in the receiving device.

In a state that data is stored in the HTTP server 133, the application 142 is allowed to read the data from the HTTP server 133 in units of segment by using an XHR (XMLHttpRequest) 141.

The application 142 reads the broadcast reception segment 125 stored in the HTTP server 133 in units of segment by using the XHR (XMLHttpRequest) 141.

While reading segments, the application 142 does not read the broadcast segments corresponding to replacement targets with the network reception segments (c) and (d), but only reads the broadcast reception segments a, b, e, and f corresponding to output targets.

Thereafter, the application 142 synthesizes the read broadcast reception segments a, b, e, and f and the broadcast reception segments (c) and (d) received from the data distribution server 22. The application 142 produces the segment series a, b, (c), (d), e, and f, which contains the advertisement content received via the network in place of program content received via the broadcast wave described above with reference to FIG. 8, without displaying the program content.

The application 142 executes a generation process for generating a media source 143 constituted by the segment series a, b, (c), (d), e, and f, which contains the network reception segment 126 in place of partial segments of the broadcast reception segment 125.

The media source 143 corresponds to the media source 110 illustrated in FIG. 10.

Note that the media source 110 described in the example illustrated in FIG. 10 contains a mixture of data at various bitrates. According to the example illustrated in FIG. 11, however, it is assumed that one bitrate to be output is determined beforehand for simplifying the description. It is therefore assumed that the process described herein is performed for segments at this bitrate.

As described above, the application 142 executes the generation process for generating the media source 143 containing the network reception segment 126 in place of partial segments of the broadcast reception segment 125.

Thereafter, the media source 143 is divided according to types of data to generate an image-associated source buffer 144 and an audio-associated source buffer 145.

The image-associated source buffer 144 is decoded by an image decoder 134, and displayed on an image display unit 135.

The audio-associated source buffer 145 is decoded by an audio decoder 136, and output to an audio output unit 137.

A segment thus reproduced corresponds to a reproduction segment 127 illustrated in the figure. Accordingly, produced is the reproduction segment 127 containing the network reception segment 126 in place of partial segments of the broadcast reception segment 125.

For example, a series of data from time t0 to time t3 illustrated in FIG. 8 is displayed.

The synthesis process for synthesizing the broadcast reception segment 125 and the network reception segment 126 executed by the application 142 as described with reference to FIG. 11 is performed by using media source extensions (MSE)-API described above with reference to FIG. 10.

Following algorithm is an example of processing algorithm of this API.

<script>
var video=document.getElementById('v');
var mediaSource=new MediaSource( );
mediaSource.addEventListener('sourceopen',onSourceOpen.bind(this, video));
video.src=window.URL.createObjectURL(mediaSource);
var videoSourceBuffer=mediaSource.addSourceBuffer('video/mp4;
codecs="avc1.4d401f"');
var audioSourceBuffer=mediaSource.addSourceBuffer('audio/mp4; codecs="mp4a.40.2"')
</script>

An outline of foregoing API process is as follows.

(S1) A new media source 143 is generated.

(S2) A video source buffer 144 and an audio source buffer 145 associated with the media source 143 are appended to set a media buffer as a video object of HTML5.

The application 142 executes a process for setting the foregoing synthesis segment for the media source 143, the video source buffer 144, and the audio source buffer 145 generated by this API process.

However, a problem of a reproduction delay arises in the segment synthesis process described with reference to FIG. 11. More specifically, there is a possibility that the display timing of network reception content is delayed from a specified time, for example. Particularly at the time of switching of program content of a live event or channels, the problem of the delay becomes remarkable.

A major factor for this problem is the necessity of time for performing the series of synthesis processes described with reference to FIG. 11.

Particularly, the processing time for following processes is considered as possible factors for the delay.

(a) storage of the broadcast reception segment 125 in the HTTP server 133, and reading in units of segment by the application 142 from the HTTP server 133

(b) replacement and appendance of segment data with the media source 143 by the application 142

The series of these processes are considered as major factors for producing a delay.

In the process (a), as described above, the broadcast reception segment 125 is temporarily stored in the HTTP server 133. Thereafter, the application 142 reads the broadcast reception segment 125 stored in the HTTP server 133 in units of segment by using the XHR (XMLHttpRequest) 141.

In the process (b), the application 142 replaces partial segments of the broadcast reception segment 125 with the network reception segment 126 to generate the media source 143.

It is considered that predetermined time required for these processes inevitably produces a reproduction delay.

Furthermore, the application 142 often needs to be switched at the time of program switching or channel switching. In this case, processing time for this application switching may further increase a delay. One of the methods for reducing the delay is that the application 125 executes push-based data transmission and reception via web socket API by using a web socket server instead of the HTTP server 133. In this case, however, time required for a process for receiving and transmitting at least one segment does not decrease.

[6. Embodiment Eliminating or Reducing Delay Produced by Synthesis Process of Reception Data Received Via Broadcast Wave and Network]

Discussed hereinafter is an embodiment which eliminates or reduces a delay produced by a synthesis process for synthesizing reception data received via a broadcast wave and a network.

Figure 12:
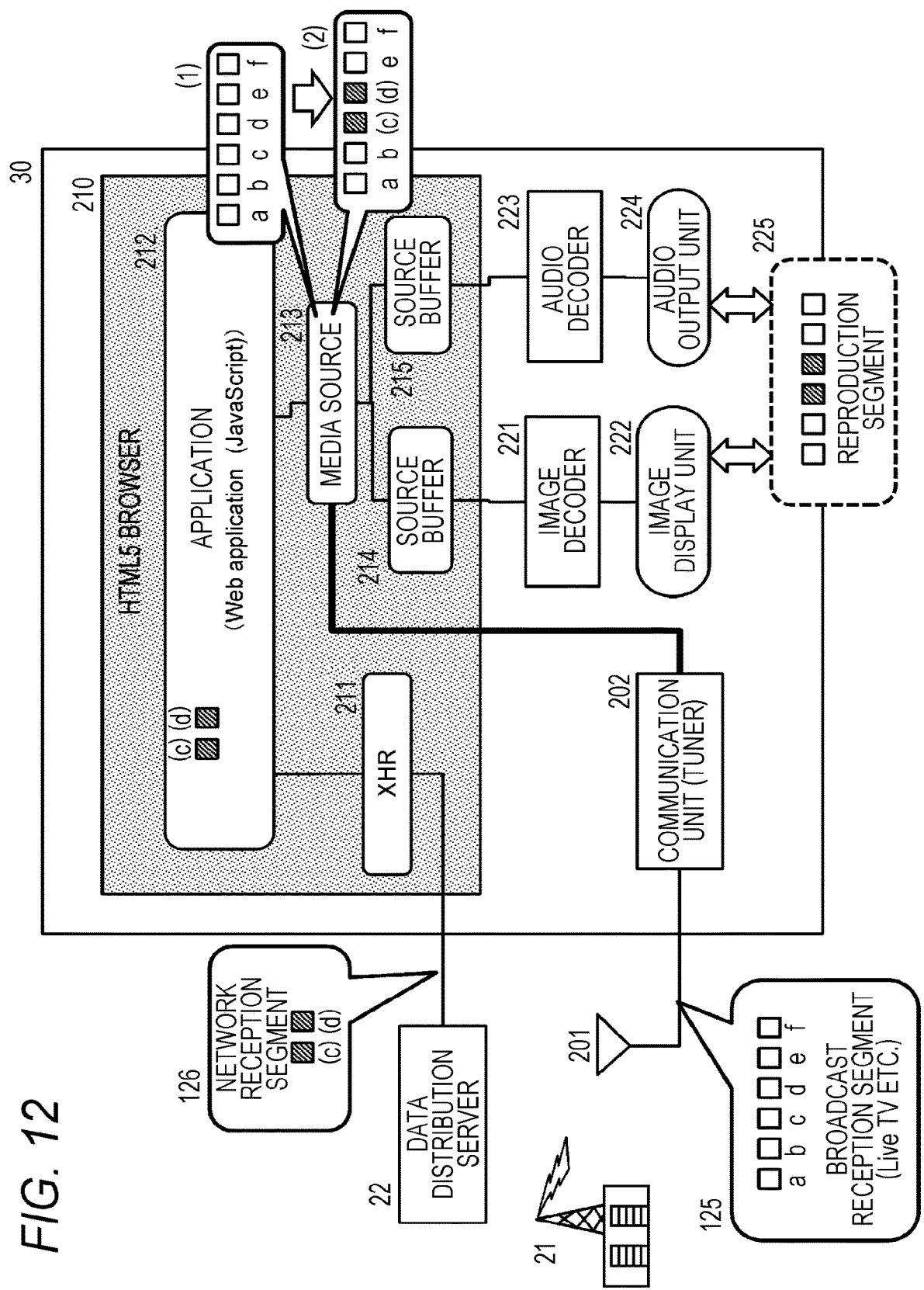
FIG. 12 is a diagram illustrating a synthesis process by a receiving device (client) according to the present disclosure, i.e., a process for replacing a part of broadcast wave reception data with network reception data, and outputting the resultant data.

FIG. 12 is a diagram illustrating a synthesis process performed by the receiving device (client) 30 according to the present disclosure, i.e., a process which replaces a part of broadcast wave reception data with network reception data, and outputs the resultant data.

Note that, similarly to the process illustrated in FIG. 11, FIG. 12 shows an example of a process which replaces a part of broadcast wave reception data with network reception data, and outputs the resultant data, i.e., a process of data replacement described with reference to FIG. 8.

The receiving device (client) 30 receives a broadcast wave from the broadcast server 21 via an antenna 131.

The receiving device (client) 30 further receives data from the data distribution server 22.

The data received via the antenna 131 is referred to as the broadcast reception segment 125, while the data received from the data distribution server 22 is referred to as the network reception segment 126.

It is assumed that the broadcast wave segment 125 is program content such as a movie, and that the network reception segment 126 is advertisement content displayed at predetermined timing in the program content, for example.

The example illustrated in the figure shows six partial segments a, b, c, d, e, and f of the broadcast reception segment 125.

On the other hand, the example illustrated in the figure shows two segments (c) and (d) of the network reception segment 126.

Note that each segment is MPEG-compressed data (MP4 data), for example, decodable in units of segment.

Data replacement is performed in units of segment.

The two advertisement segments (c) and (d) of the network reception segment are output in place of the segments c and d of the segments a, b, c, d, e, and f contained in the broadcast reception segment 125.

In other words, output content from the receiving device 30 is constituted by a following segment series.

a, b, (c), (d), e, and f

The segments a, b, e, and f of the above segment series are broadcast reception segments, while the segments (c) and (d) are the network reception segments.

The receiving device 30 includes a browser (HTML5 browser) 210, and executes an application (web application (JavaScript (registered trademark)) 212 by using the browser 210.

The application 212 performs a synthesis process for synthesizing the broadcast reception segment 125 and the network reception segment 126.

According to the configuration illustrated in FIG. 12, the broadcast reception segment 125 constitutes a media source 213 without change.

According to the configuration described above with reference to FIG. 11, the broadcast reception segment 125 is temporarily stored in the HTTP server 133 corresponding to a proxy server included in the receiving device. Thereafter, the application executes reading from the server in units of segments.

According to the configuration illustrated in FIG. 12, however, the processes for storing and reading the broadcast reception segment 125 into and from the HTTP server are not executed. In this case, the broadcast reception segment 125 constitutes the media source 213 without change.

At this time, the media source 213 is constituted by the broadcast reception segments a, b, c, d, e, and f corresponding to the segment series (1) shown in the figure. In other words, the broadcast reception segments are transmitted to an image decoder and an audio decoder, and reproduced by these decoders regardless of execution of the application 212.

Thereafter, the application 212 starts in linkage with a broadcast program in response to signaling transmitted via a broadcast wave, obtains only the segments (c) and (d) of the network reception segment 126, and executes a process for replacing partial segments c and d of the media source 213 constituted only by the broadcast reception segments a, b, c, d, e, and f with the network reception segments (c) and (d).

More specifically, the application 212 executes a process for updating a media source (1) constituted only by the broadcast reception segments a, b, c, d, e, and f to generate a media source (2) constituted by a segment series of a, b, (c), (d), e, f.

As described above, the application 212 executes control of the media source update process for replacing partial constituent segments of the media source constituted only by the broadcast reception segment series with the network reception segment.

Specific processing for this process will be described below.

Thereafter, the media source (2) 213 containing the segment series of a, b, (c), (d), e, f is distributed according to types of data to generate an image-associated source buffer 214 and an audio-associated source buffer 215.

The image-associated source buffer 214 is decoded by an image decoder 221, and displayed on an image display unit 222.

The audio-associated source buffer 215 is decoded by an audio decoder 223, and output to an audio output unit 224.

A segment thus reproduced is a reproduction segment 225 illustrated in the figure. In this case, partial segments of the broadcast reception segment 125 are replaced with the network reception segment 126 for reproduction.

For example, a series of data from time t0 to time t3 illustrated in FIG. 8 is displayed.

The synthesis process performed by the application 212 for synthesizing the broadcast reception segment 125 and the network reception segment 126 as described with reference to FIG. 12 is achieved by utilizing new application programming interface (API) on the basis of media source extensions (MSE)-API described above with reference to FIG. 10.

Following algorithm is an example of processing algorithm for this new API.

```
<script>
var video=document.getElementById('v');
var tuner=navigator.tv.currentTuner( );
```

```
var mediaSource=.tuner.getMediaSource( );
mediaSource.addEventListener('sourceopen',onSourceO
pen.bind(this,video));
  video.src=window.URL.createObjectURL(media-
Source);
  var videoSourceBuffer=mediaSource.sourceBuffers[0];
  var audioSourceBuffer=mediaSoorce.sourceBuffers[1];
</script>
```

The outline of the foregoing processing for foregoing new API is as follows.

(S1) the media source 213 for storing a segment received by the communication unit (tuner) 202 is obtained, and set referable by the application 142.

(S2) the video source buffer 214 and the audio source buffer 215 associated with the media source 213 are obtained, and set referable by the application 142. The media source 213 is set as a video object of HTML5.

The application 142 refers to the media source 212, the video source buffer 214, and the audio source buffer 215 referable as a result of the foregoing API processing, and executes segment replacement which replaces segments received via the communication unit (tuner) 202 and stored in the objects of the source and buffers with the network reception segment.

Accordingly, the application 142 checks the broadcast reception segment media source referable as a result of new API processing, and a data storage status of the broadcast reception segments in the source buffers, and executes a process for replacing the broadcast reception segments at the time positions for insertion of reproduction advertisement content with the network reception segments when confirming that the broadcast reception segments corresponding to replacement targets have been stored in the buffers.

According to the processing example described with reference to FIG. 12, the broadcast reception media segments are not processed by the application. Accordingly, the factors for producing a reproduction delay as described above with reference to FIG. 11 do not occur.

More specifically, a processing time for following processes is not required, wherefore a processing delay is eliminated.

(a) storage of the broadcast reception segment in the HTTP server, and reading by application from the HTTP server in units of segment (b) replacement and appendance process of the broadcast reception segment with the media source by the application According to the processing example described with reference to FIG. 12, the series of processes corresponding to the factors for producing a delay are not required, wherefore the reproduction delay is not produced.

According to the processing configuration illustrated in FIG. 12, the broadcast reception segment 125 is set as the media source 213 without change. In this case, the necessity of the storage process of the broadcast reception segment 125 in the HTTP server, and the reading process by the application is eliminated. Moreover, the process for generating the media source by the application is not required.

Furthermore, switching of the application is required at the time of program switching or channel switching. However, the media source constituted by the broadcast reception segment is generated regardless of app. switching. In this case, problems of a delay of media source generation, and interruption of broadcast segment reproduction caused at the time of application switching do not occur by requirement of an application switching time.

Details of the media source update process executed by the application 212 illustrated in FIG. 12 are now described with reference to FIG. 13.

Figure 13:
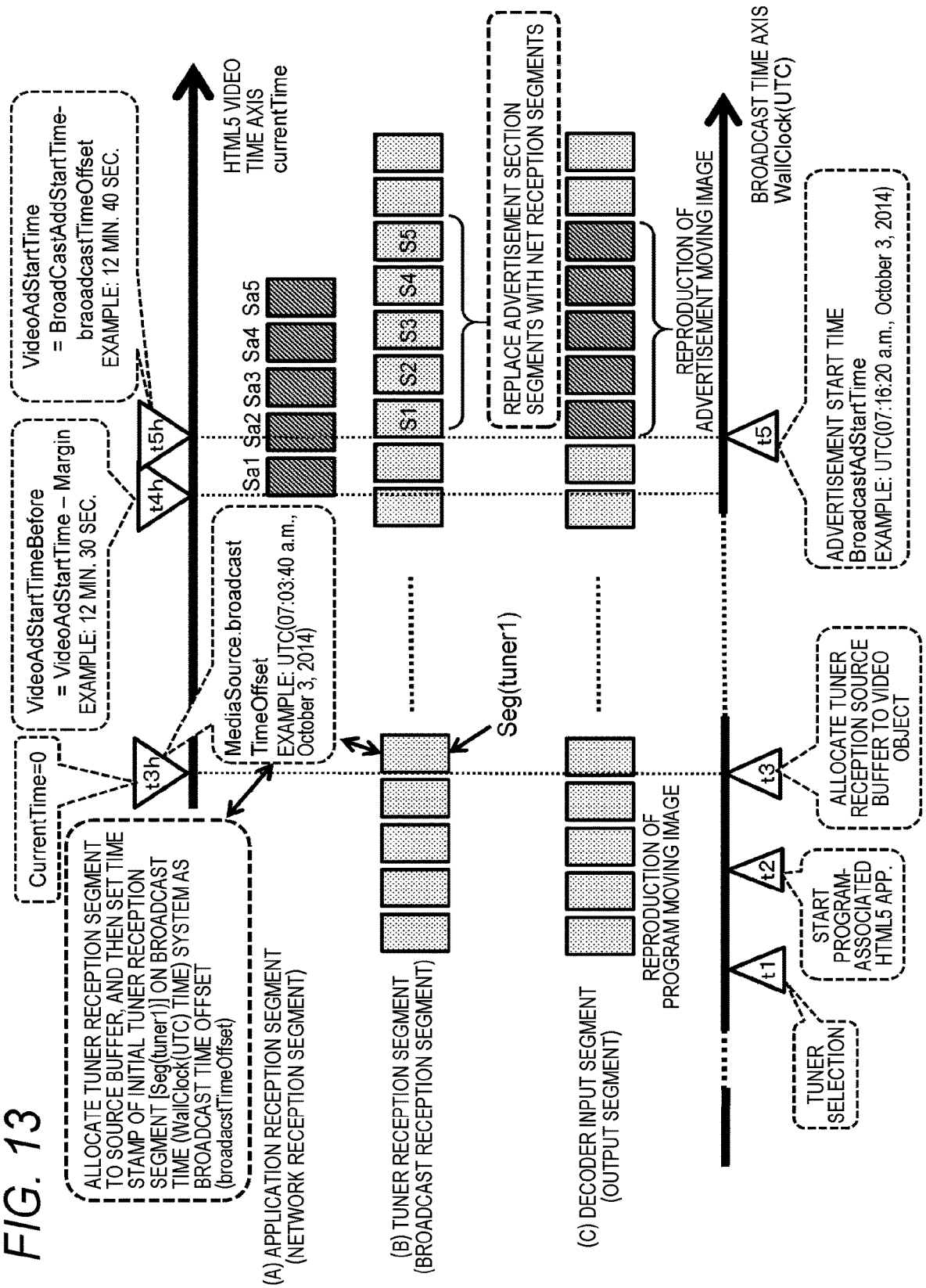
FIG. 13 is a view illustrating a media source update process for replacing a part of broadcast wave reception data with network reception data, and outputting the resultant data.

FIG. 13 shows following three sets of data in time series. (Time passes from left to right.)

(A) application reception segment (network reception segment)

(B) tuner reception segment (broadcast reception segment)

(C) decoder input segment (output segment)

Following two time axes are provided as time axes. broadcast time axis (WallClock (UTC)) in lower stage HTML5 video object time axis (CurrentTime) in upper stage The broadcast time axis (WallClock (UTC)) is a time axis indicating time adopted for time management of data transmitted by the broadcast server 21 via a broadcast wave (reception video and audio reproduction time axis).

Discussed herein is an example which uses a wall clock (WallClock (UTC)) corresponding to so-called real time information.

A time stamp based on the broadcast time axis (WallClock (UTC)) is set for the broadcast reception segment received via the broadcast wave.

On the other hand, the HTML5 video time axis (CurrentTime) is an application time axis (application media reproduction time axis) specifying processing time of the application 212, and time for management of data generated by the application 212.

The application 212 executes processing on the basis of the HTML5 video time axis (CurrentTime).

In FIG. 13, respective times t3$h$ through t5$h$ on the HTML5 video time axis (CurrentTime) are given (h) to indicate that these times correspond to times on the HTML5 video time axis (CurrentTime).

Processes performed in periods of t1 through t5 and t3$h$ through t5$h$ indicated on the respective time axes are hereinafter sequentially described.

(Time t1)

Initially, at the time t1, the receiving device initially performs tuner selection. For example, the receiving device starts reception of a program at a particular channel selected by the user.

In accordance with the start of the program reception by the tuner, the tuner reception segment (broadcast reception segment) (B) is transmitted from the broadcast server 21, and sequentially received by the receiving device 30.

At this time, the segment synthesis process by the application 212 does not start. In this case, the tuner reception segment (broadcast reception segment) (B) is set as the data coder input segment (output segment) (C) without change. The tuner reception segment (broadcast reception segment) is decoded and output (as display or audio output).

(Time t2)

At the time t2, the application (HTML5 app.) 212 set in association with the tuner reception program starts.

The application 212 starts on the basis of trigger information contained in the tuner reception program, or metadata included in the tuner reception program, for example.

The application 212 may be configured to start in response to an application start instruction issued from the user.

(Time t3 (=t3$h$))

The time t3 is a time when processing by the application 212 is allowed to start after the start of the application at the time t2.

The processing starting time of the application 212 is set to a start point of the HTML5 video time axis (current- Time=0). In this case, CurrentTime of the HTML5 video time axis is updated in accordance with reproduction of the tuner reception program.

The processing timing of the application is determined on the basis of the HTML5 video time (currentTime).

At the time t3 (t3$h$=CurrentTime=0), the application 212 secures the media source and the source buffers as processing target objects.

This process is performed by processing of new API described above with reference to FIG. 12. As discussed above, processing of new API is as follows.

(S1) the media source 213 for storing a segment received by the communication unit (tuner) 202 is obtained, and set referable by the application 142.

(S2) the video source buffer 214 and the audio source buffer 215 associated with the media source 213 are obtained, and set referable by the application 142.

These API processes allow the application 212 to execute processing based on checking of the buffer status with reference to the media source and the source buffers.

Note that the media source 213, and the source buffers 214 and 215 illustrated in FIG. 12 are objects corresponding to processing targets of the application 212. More specifically, these source and buffers 213, 214, and 215 correspond to a broadcast reception segment series stored in the storage unit (buffer) of the receiving device 30.

The video source buffer 214 corresponds to a segment series constituted only by video data stored in the storage unit (buffer) of the receiving device 30.

The audio source buffer 215 corresponds to a segment series constituted only by audio data stored in the storage unit (buffer) of the receiving device 30.

The media source 213 corresponds to a broadcast reception segment series containing video data and audio data stored in the storage unit (buffer) of the receiving device 30.

After the time t3 (=t3$h$), the application 212 is allowed to refer to the media source 213 and the source buffers 214 and 215 (broadcast reception segment series stored in the storage unit), and perform various processes.

After the time t3 (=t3$h$), the application initially obtains a time stamp set for a tuner reception segment newly set for the media source 213, i.e., a broadcast reception segment newly stored in the storage unit (buffer) of the receiving device 30.

According to the example illustrated in the figure, a segment [Seg (tuner1)] corresponds to a tuner reception segment initially input to the media source 213 after the time t3 (=t3$h$).

The application 213 obtains a time stamp set for the segment [Seg (tuner1)].

A time stamp of the broadcast time system, i.e., a time stamp based on a wall clock (WallClock (UTC)) is set for the broadcast reception segment.

The application calculates a broadcast time offset (broadcastTimeOffset) corresponding to a difference (time offset) between the broadcast time axis (WallClock (UTC)) and the HTML5 video time axis (currentTime) on the basis of the time stamp (WallClock (UTC)).

More specifically, the broadcast time offset (broadcastTimeOffset) is set to the time indicated by the time stamp set for the tuner reception segment [Seg (tuner1)] initially input to the media source 213 after the time t3 (=t3$h$).

It is assumed, as a specific example, that the time stamp set for the segment [Seg (tuner1)] is UTC 07:03:40 a.m., Oct. 3, 2014.

In this case, the application sets the broadcast time offset (broadcastTimeOffset) to the above time. More specifically, broadcastTimeOffset=UTC 07:03:40 a.m., Oct. 3, 2014 is set.

This time offset corresponds to a difference (time offset) between the broadcast time axis (WallClock (UTC)) and the HTML5 video time axis (currentTime).

More specifically, at the time t3 (=t3$h$), HTML5 video time: currentTime=0, and the broadcast time: (WallClock (UTC))=07:03:40 a.m., October 3, 014 are set. In this case, the time offset: broadcastTimeOffset=UTC 07:03:40 a.m., Oct. 3, 2014 corresponds to the difference (time offset) between the broadcast time axis (WallClock (UTC)) and an HTML5 video time axis (currentTime).

Note that the example of the time offset calculation process described above is a processing example of calculation by using a time stamp of a broadcast reception segment stored in the media source corresponding to the processing target object of the application 212, i.e., stored in the storage unit as the media source. In this case, use of data obtained from the media source without change is allowed by using new API (MSE-API) described above.

In other words, the time offset calculation processing example may be executed as a process for obtaining time offset information by using API.

Alternatively, the time offset information may be obtained from other objects. For example, offset information may be obtained or calculated from the communication unit (tuner) 202 allowed to be set as an application processing object other than the media source, or obtained or calculated via an object such as video data.

(Time t4$h$)

Thereafter, the application starts reception of a synthesis segment via the network at the time t4$h$. More specifically, the application starts a process for receiving a network reception segment constituted by advertisement content or the like to be output in place of the broadcast reception segment.

Note that the reception start time t4$h$ of the synthesis segment via the network is set to a time before the output start time t5 (BroadcastAdStartTime) of the network reception segment (advertisement: Ad) (=t5$h$=VideoAdStartTime) by a predetermined period (margin)].

The margin may be determined on the basis of a time required for obtaining data via the Internet, for example.

The application 212 calculates the reception start time t4$h$ of the synthesis segment via the network by using a following equation.

$$t4h\text{=VideoAdStartTimeBefore=}t5h- \text{Margin=VideoAdStarttime-Margin=}t5- \text{broadcastTimeOffset=BroadcastAdStartTime-} \text{broadcastTimeOffset}$$

Note that t4$h$:VideoAdStartTimeBefore, t5$h$:VideoAdStarttime, and Margin correspond to time information based on the HTML5 video time axis (currentTime).

t5:BroadcastAdStartTime

The time t5: BroadcastAdStartTime is time information based on the broadcast time axis (WallClock(UTC)).

Note that the application 212 may obtain the output start time t5 (BroadcastAdStartTime) of (Advertisement: Ad) on the basis of content (program) attribute information (metadata).

In addition, broadcastTimeOffset is a time offset calculated at the time t3 (=t3h). In this case, broadcastTimeOffset is UTC 07:03:40 a.m., Oct. 3, 2014.

The application 212 calculates the reception start time t4h of the synthesis segment via the network on the basis of the foregoing respective sets of data.

After the time t4h, the application 212 sequentially receives network reception segments (advertisement: Ad) via the network.

More specifically, segments Sa1 through Sa5 illustrated in FIG. 13 are received.

The application executes a process for setting the respective network reception segments Sa1 through Sa5 at positions of tuner reception segments S1 through S5.

More specifically, the application performs a process for replacing the tuner reception segments S1 through S5 with the network reception segments Sa1 through Sa5.

The application 212 checks a storage status of the broadcast reception segment stored in the media source 213 and the source buffers 214 and 215 made referable by the processing of new API (new MSE-API) described above, and executes the segment replacement process.

The segment replacement process is performed in time for output of the network reception segment after replacement.

For example, the network reception segment Sa1 is set in place of the tuner reception segment S1, and output at the output time of the tuner reception segment S1 (t5).

Accordingly, the replacement process of the network reception segment Sa1 needs to be completed by the advertisement start time t5 (=BroadcastAdStartTime=07:16:20 a.m., Oct. 3, 2014).

According to the example illustrated in FIG. 13, the time t5h (=t5) is the advertisement start time.

This time corresponds to the time for output of the segment of the source buffer (S1). In this case, the network reception segment Sa1 and the subsequent segments are sequentially set for replacement from a start position of the replacement target segment series, i.e., the segment (S1) for which the time stamp of the time (t5) has been set.

For this process, the application converts the advertisement start time t5 (=BroadcastAdStartTime=07:16:20 a.m., Oct. 3, 2014) based on the wall clock (WallClock (UTC)) of the broadcast time system into the time t5h (VideoAdStartTime) based on the application time axis [HTML5 video time axis (currentTime)].

The conversion process is executed by using a following equation.

$$t5h(\text{VideoAdStartTime}) = t5 - (\text{broadcastTimeOffset}) = \\ (\text{BroadcastAdStartTime}) - \\ (\text{broadcastTimeOffset}) = (07:16:20 \text{ a.m.,} \\ \text{Oct. 3, 2014}) - (07:03:40 \text{ a.m., Oct. 3, 2014}) = 12 \\ \text{minutes and 40 seconds}$$

Note that the t5h:VideoAdStarttime is time information based on the HTML5 video time axis (currentTime).

The time t5: BroadcastAdStartTime is time information based on the broadcast time axis (WallClock(UTC)).

Note that the application 212 may obtain the output start time t5 (BroadcastAdStartTime) of (Advertisement: Ad) on the basis of content (program) attribute information (metadata).

Alternatively, the output start time t5 (BroadcastAdStartTime) may be obtained from the time stamp of the broadcast reception segment S1 stored in the storage unit (buffer).

The advertisement start time t5 (BroadcastAdStartTime=07:16:20 a.m., Oct. 3, 2014) based on the wall clock (WallClock (UTC)) of the broadcast time system is set for the segment S1 as the time stamp indicating the output time.

In addition, broadcastTimeOffset in the above equation is a time offset calculated at the time t3 (=t3h), wherefore broadcastTimeOffset=UTC 07:03:40 a.m., Oct. 3, 2014 is set.

The period 12 minutes and 40 seconds calculated by the above calculation equation corresponds to a time on the HTML5 video time axis (currentTime), i.e., an elapsed time from the application start time: t3h=0.

The application executes a process for replacing the broadcast reception segment S1 stored in the storage unit (buffer) of the receiving device with the network reception segment Sa1 within the calculated period currentTime=12 minutes and 30 seconds.

The application executes a process for replacing the broadcast reception segment set as an output target, i.e., the segment S1, with the network reception segment Sa1 at the time (currentTime) based on the HTML5 video time axis.

For the subsequent segments S2 through S5, the application executes similar processing before an elapse of a time stamp indicating the output time set for each of the segments to replace the segments S2 through S5 with the network reception segments Sa2 through Sa5.

(Time t5h (=t5))

The segments S1 through S5 of the broadcast reception segment stored in the storage unit of the receiving device 30 are sequentially replaced with the network reception segments Sa1 through Sa5 by the processing of the application 212 to sequentially output the network reception segments Sa1 through Sa5 as replacements after the advertisement start time t5 (BroadcastAdStartTime=07:16:20 a.m., Oct. 3, 2014).

The decoder input segment (c) illustrated in FIG. 13 represents a segment series after replacement. This segment series is input to the decoder for decoding, and output to the output unit such as the display unit.

This process achieves replacement of a part of the broadcast wave reception segment with the network reception segment, and realizes data switching display as described above with reference to FIG. 8.

More specifically, this process achieves data output for switching program content corresponding to broadcast reception data into advertisement content corresponding to network reception data at predetermined timing, and thereafter again switching the content into the program content corresponding to broadcast reception data.

After the time t3h, the application 212 obtains a time stamp corresponding to the output time of the buffered broadcast reception segment while referring to the tuner reception segment (B) in FIG. 13 set as an object referable by the application 212, i.e., the broadcast reception segment stored in the storage unit (buffer), and completes the process for replacing the broadcast reception segments S1 through S5 with the network reception segments Sa1 through Sa5 before the time of each time stamp.

The broadcast reception segment stored in the storage unit (buffer) is set for the media source 213 and the source buffers 214 and 215 as the processing target objects of the application 212 by the processing of new API described above. The application is allowed to check the buffer status.

The application 212 checks the time stamps of the buffered broadcast reception segments S1 through S5, and completes the replacement process by the set time of each time stamp.

Note that each of the time stamps of the broadcast reception segments S1 through S5 is time information based on the broadcast time axis (WallClock (UTC)).

The application 212 converts the set time of each time stamp into time information based on the HTML5 video time axis (currentTime) while considering the time offset: broadcastTimeOffset=UTC 07:03:40 a.m., Oct. 3, 2014 calculated at the foregoing time (t3h).

The replacement process for the respective segments is completed before each output start time of the segments on the basis of the time generated by this conversion process.

As described above, the application 212 executes the media source update process for replacing a part of the broadcast reception segment stored in the storage unit (buffer) of the receiving device 30 with the network reception segment.

This process achieves replacement of a part of the broadcast wave reception segment with the network reception segment, and realizes data switching display as described above with reference to FIG. 8.

More specifically, this process achieves data output for switching program content corresponding to broadcast reception data into advertisement content corresponding to network reception data at predetermined timing, and thereafter again switching the content into the program content corresponding to broadcast reception data.

According to this embodiment, the tuner reception segment is not stored into nor read from the HTTP server, but directly set as a source buffer as a processing target object of the application 212.

The application 212 replaces a part of the segment of the source buffer constituted only by the broadcast wave reception segment with the network segment by the source buffer update process including replacement of the segment of the source buffer.

This source buffer update process is a process executed in an extremely short time in comparison with the data storing and reading process into and from the HTTP server, and therefore completes output of the segment subjected to replacement without producing a delay.

[7. Hardware Configuration Example Applied to Data Reception and Synthesis Process by Receiving Device]

A hardware configuration example applied to data reception and synthesis processing performed by the receiving device is hereinafter described with reference to FIG. 14.

Figure 14:
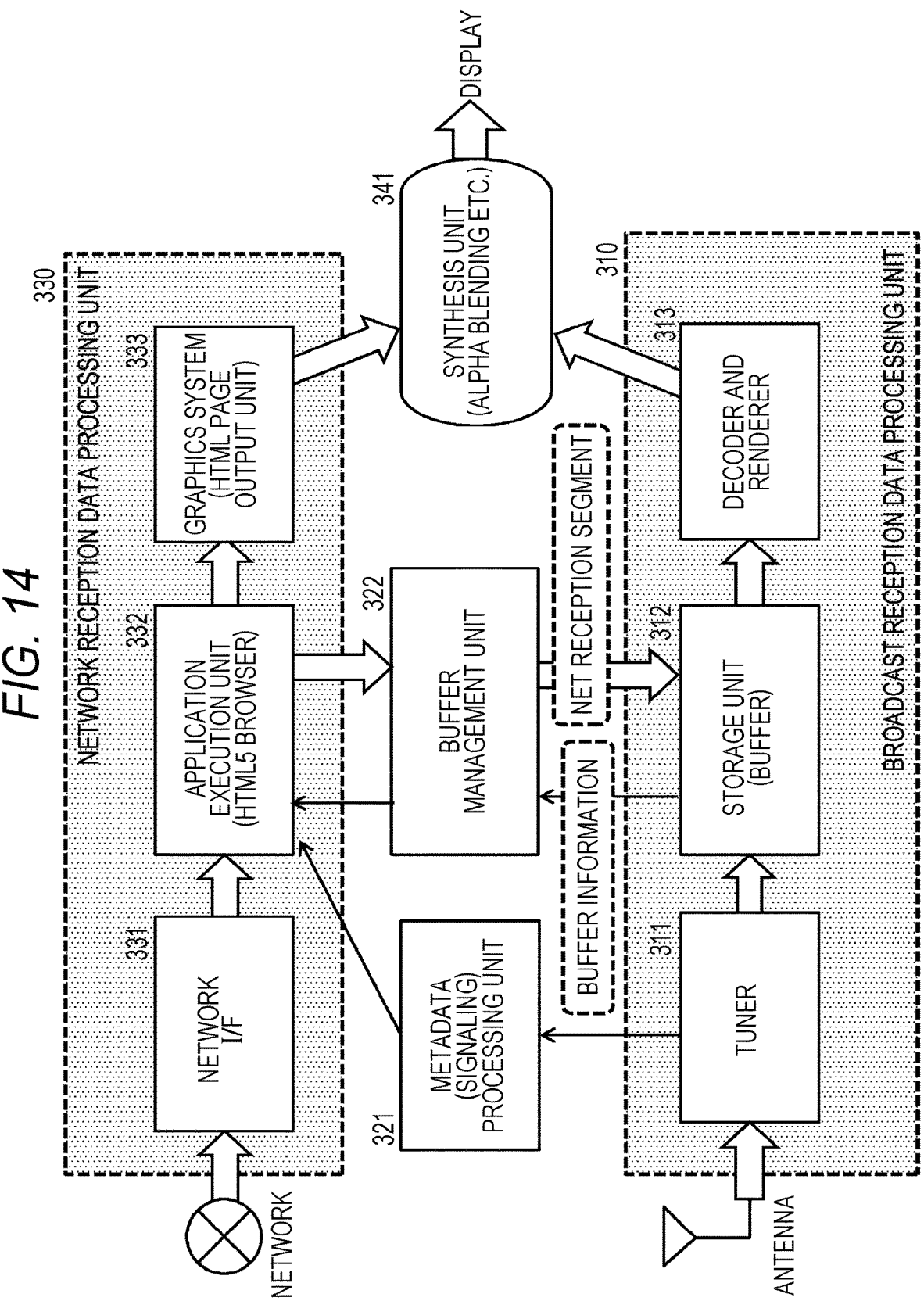
FIG. 14 is a diagram illustrating a hardware configuration example applied to data reception and the synthesis process of the receiving device.

FIG. 14 is a diagram illustrating a hardware configuration example of the receiving device 30 executing following processes of (a) data reception process via a network and a broadcast wave, and (b) data generation process for executing a data synthesis process (segment synthesis process) based on reception data, and outputting the result to the output unit such as the display unit.

As illustrated in FIG. 14, the receiving device 30 includes a broadcast reception data processing unit 310 and a network reception data processing unit 330. The receiving device 30 further includes a metadata (signaling) processing unit 321, a buffer management unit 322, and a synthesis unit 341.

A broadcast reception data processing unit 310 includes a tuner 311, a storage unit (buffer) 312, and a decoder and renderer 313.

In addition, the network reception data processing unit 330 includes a network I/F 331, an HT application execution unit (HTML5browser) 332, and a graphic system (HTML page output unit) 333.

Data transmitted via the broadcast wave is received by the tuner 311 of the broadcast reception data processing unit 310 via an antenna. The reception data is stored in the storage unit (buffer) 312, and subsequently subjected to a decoding processing and a drawing process by the decoder and renderer 313. Thereafter, the data is synthesized by a synthesis unit 341 with an HTML page generated by the network reception data processing unit to output a synthesis image.

Data transmitted via the network is received by the network I/F 331 of the network reception data processing unit 330. The reception data is passed to the application execution unit 332, and synthesized with the foregoing broadcast reception segment as necessary.

Data generated by the application execution unit 332 is passed to the graphics system (HTML page generation unit) 333. An HTML page thus generated is output to the synthesis unit 341.

The synthesis unit 341 synthesizes the HTML page with the output data generated by the broadcast reception data processing unit to output a synthesis image.

A processing example performed by the application execution unit 332 for synthesizing the broadcast reception segment and the network reception segment as described above is now described.

All the broadcast reception segments are stored in the storage unit (buffer) 312.

The broadcast reception segment buffer storage information stored in the storage unit (buffer) 312 is obtained by the application execution unit 332 via the buffer management unit 322.

The data stored in the storage unit (buffer) 312 is data constituted by the media source 213 and the source buffers 214 and 215 corresponding to processing target objects of the application 212 illustrated in FIG. 12.

As described above, the application 212 is allowed to refer to the data stored in the storage unit (buffer) 312 by the processing of new API.

According to the hardware configuration illustrated in FIG. 14, the application execution unit 332 executes a process for obtaining buffer information via the buffer management unit 322.

In addition, the application execution unit 332 obtains, via the metadata (signaling) processing unit 321, various types of metadata (signaling data) received via the tuner 311.

For example, the metadata (signaling) contains information such as the advertisement start time (t5) described above with reference to FIG. 13.

The application execution unit 332 obtains buffer information via the buffer management unit 322, such as time stamp information on the broadcast reception segment stored in the storage unit (buffer) 312, and further obtains information via the metadata (signaling) processing unit 321, such as the advertisement start time (t5) described above with reference to FIG. 13.

The application execution unit 212 instructs the buffer management unit 322 to perform the segment replacement process described above with reference to FIG. 13, i.e., the process for replacing a part of the broadcast reception segment stored in the storage unit (buffer) 312 with the network reception segment on the basis of the foregoing information.

According to this hardware configuration example, the buffering information on the media source of the broadcast reception segment is published for API. However, the broadcast segment itself is not transmitted to the browser provided as software, but processed into hardware by the broadcast reception data processing unit. In this case, a load imposed on software decreases, wherefore low-cost equipment and low-power-consumption equipment are achievable without the necessity of equipment of a high-performance CPU and a large quantity of memories.

[8. Sequence of Processes Performed by Receiving Device]

A sequence of processes performed by the receiving device 30, and the application 212 illustrated in FIG. 12 (i.e., application execution unit 332 illustrated in FIG. 14) are hereinafter described with reference to flowcharts shown in FIG. 15 and subsequent figures.

Initially, a sequence of the overall process performed by the receiving device 30 is discussed with reference to the flowchart shown in FIG. 15.

Figure 15:
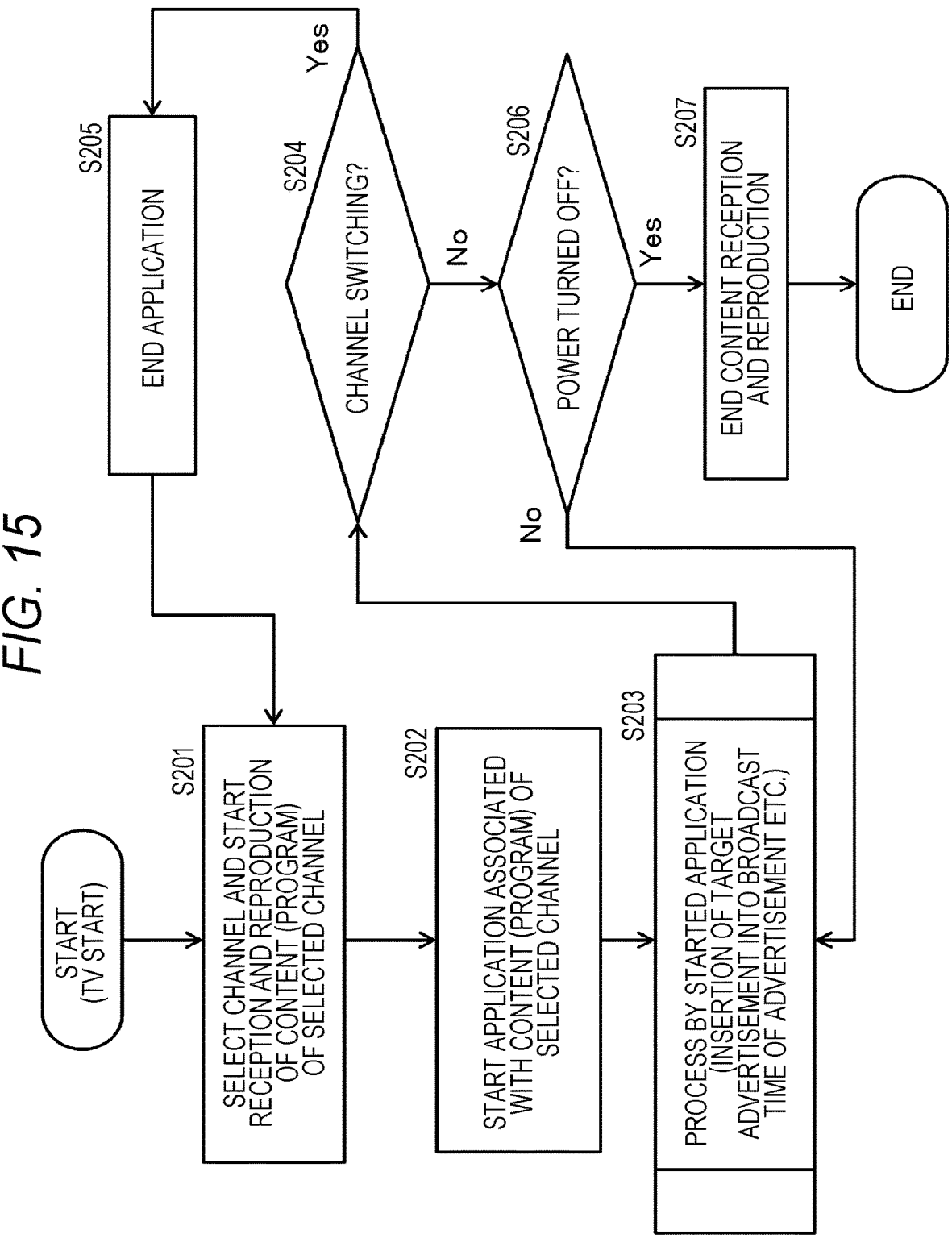
FIG. 15 is a flowchart showing a sequence of an overall process performed by the receiving device.

A flow shown in FIG. 15 is executed in accordance with a program stored in the storage unit of the receiving device 30 under control by a data processing unit of the receiving device, as a unit including a CPU or the like and having a program execution function, for example.

Hereinbelow sequentially touched upon is processing of respective steps of the flow shown in FIG. 15.

(Step S201)

In step S201, the user on the receiving device 30 side initially selects a reception channel to start a reception process and a reproduction process of content (program) of the selected channel.

This content is obtained from a broadcast wave transmitted from the broadcast server 21.

Note that the receiving device 30 receives applications associated with the content, and various types of metadata associated with the content together with reception of the content (program).

(Step S202)

Subsequently, the receiving device starts an application set in association with the content (program) selected in step S101 and initiated for reception and reproduction. For example, this application is the application 212 illustrated in FIG. 12.

The application starts on the basis of trigger information contained in the tuner reception program, or the metadata included in the tuner reception program.

The application may be configured to start in response to an application start instruction from the user.

(Step S203)

Subsequently, the receiving device 30 performs processing of the started application. More specifically, the receiving device 30 performs a data synthesis process for replacing or superimposing the network reception data received via the network, such as advertisement content with the broadcast reception data.

This process corresponds to the process described above with reference to FIGS. 12 through 14.

A detailed sequence of the application process in step S203 will be described below with reference to a flowchart shown in FIGS. 16 and 17.

(Steps S204 and S205)

Step S204 is a process for determining the presence or absence of channel switching.

When channel switching is present, the flow proceeds to step S205, whereby the application associated with the program ends. After the end of the application, the flow returns to step S201, and starts the reception and reproduction process of content (program) associated with a channel after switching.

On the other hand, when it is determined that channel switching is absent in step S204, the flow proceeds to step S206. Alternatively, even when channel switching is absent, another application may be started on the basis of trigger information contained in the metadata on the reception program as described above.

(Steps S206 and S207)

Step S206 is a process for determining whether or not the power of the receiving device 30 has been turned off by the user.

When it is determined that the power has been turned off, the process proceeds to step S207, whereby content reception and reproduction ends. The processing of the application ends accordingly.

On the other hand, when it is determined that the power has not been turned off, execution of the processing by the application in step S203 continues.

The detailed sequence of the application process executed in step S203 is hereinafter described with reference to the flowchart shown in FIGS. 16 and 17.

Figure 16:
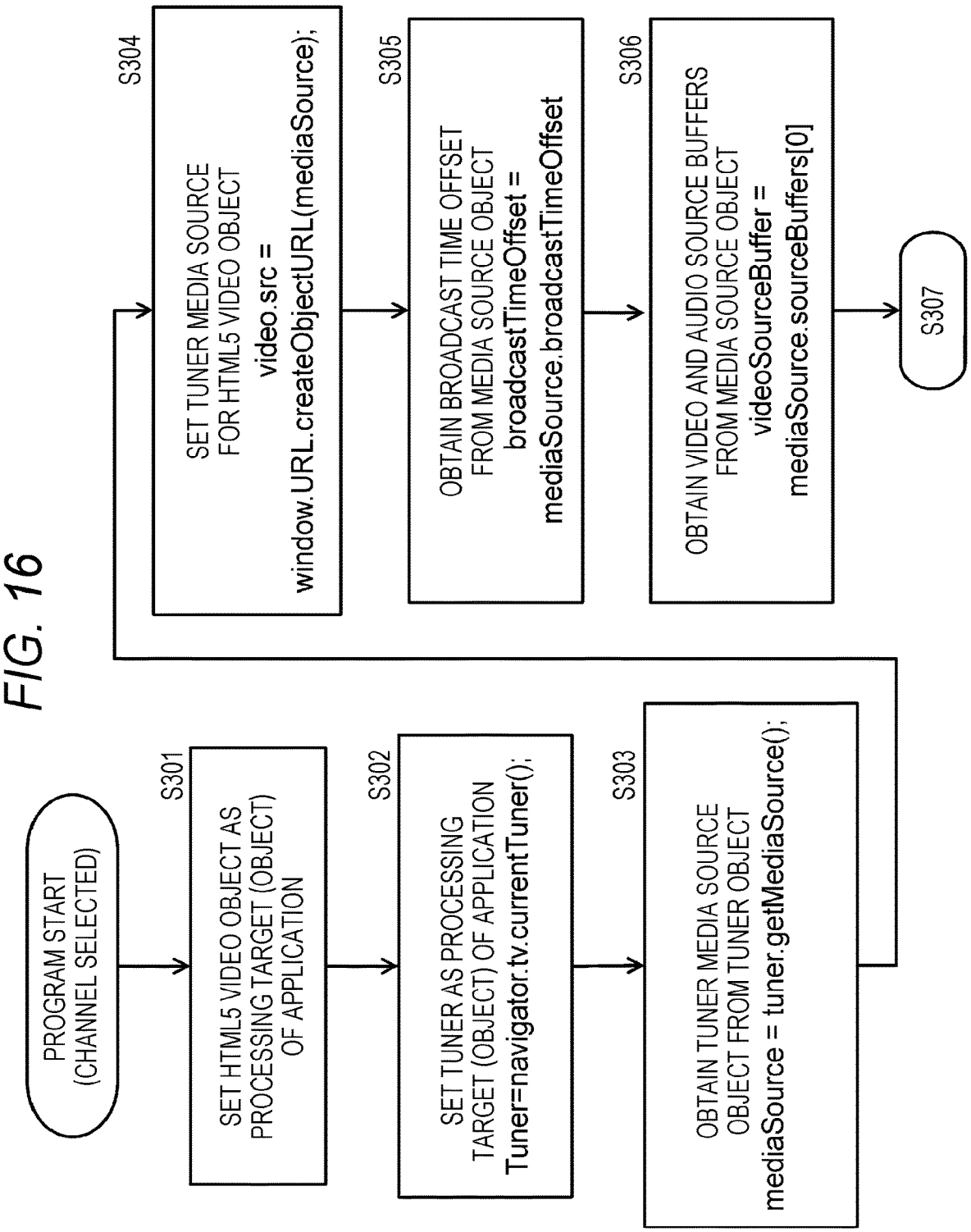
FIG. 16 is a flowchart showing a sequence of a process executed by an application of the receiving device.

Details of processing of respective steps are sequentially discussed from step S301 of the flow shown in FIG. 16.

Note that the application herein is the application 212 described with reference to FIG. 12. More specifically, the application is an HTML5 application operated by the browser.

(Step S301)

Initially, the application sets an HTML5 video object as a processing target (object) of the application in step S301.

This process is a preparatory process for the synthesis process of the broadcast reception data and the network reception data, and corresponds to a process for setting HTML5 video data as a synthesis data processing object generated by the application.

(Step S302)

In subsequent step S302, the application sets a tuner as a processing target (object) of the application. This tuner is the communication unit (tuner) 202 for receiving the broadcast reception segment 125 illustrated in FIG. 12.

This process is also a preparatory process for the synthesis process of the broadcast reception data and the network reception data, and corresponds to a process for setting the communication unit (tuner) 202 for receiving broadcast reception data as a processing target (object). In this case, "CurrentTuner" is to obtain an object of a tuner displayed on TV when the receiver carries a plurality of tuners. This tuner object is also used as API for instruction of channel switching by the application.

Note that this process is executed as a process performed under new API described above.

This process corresponds to a following process contained in processing algorithm executed by new API (MSE-API) described above.

tuner=navigator.tv.currentTuner( );

(Step S303)

In subsequent step S303, the application obtains a tuner media source object from the tuner object set as the processing target object in step S320.

This process corresponds to the process for obtaining the media source 213 illustrated in the figure.

The communication unit (tuner) 202 illustrated in FIG. 12 receives the broadcast reception segment 125 transmitted from the broadcast server 21. This reception segment is stored in the storage unit (buffer) as a media source. However, as illustrated in a hardware configuration of FIG. 14, the reception segment from the tuner is not involved in the execution unit of the application. In this case, the broadcast reception segment 125 is stored in the storage unit (buffer) 312, and reproduced after passing through the decoder and renderer 313.

The application obtains the object as the media source 213 illustrated in FIG. 12, i.e., a media source corresponding to a processing target object of the application providing buffering information on the broadcast reception segment stored in the storage unit (buffer) 312.

Note that this process is also executed as a process performed under new API described above.

This process corresponds to a following process contained in processing algorithm executed by new API (MSE-API) described above.

mediaSource=.tuner.getMediaSource( );

(Step S304)

In subsequent step S304, the application sets the tuner media source object obtained in step S303 as the HTML5 video object determined as the application processing target object in step S301.

More specifically, this step is a preparatory process for the synthesis process by the application, i.e., a process for setting the media source constituted only the broadcast reception segment as the HTML5 video object.

This process is a process for setting the segment series containing the segment S1 and the like of the tuner reception segment (B) illustrated in FIG. 13 (i.e., media source before update) as the HTML5 video object, for example.

Note that this process is also executed as a process performed under new API described above.

This process corresponds to a following process contained in processing algorithm executed by new API (MSE-API) described above. Note that this process is the same as the process performed by original MSE API.

video.src=window.URL.createObjectURL(media-Source);

(Step S305)

In subsequent step S305, the application obtains a broadcast time offset from the tuner media source object obtained in step S303.

This time offset obtaining process is the process for obtaining the broadcast time offset (broadcastTimeOffset) described above with reference to FIG. 13.

A time stamp based on the broadcast time system, i.e., the wall clock (WallClock (UTC)), is set for the broadcast reception segment contained in the tuner media source object.

On the basis of this time stamp (WallClock (UTC)), the application determines a broadcast time offset (broadcastTimeOffset) corresponding to a difference (time offset) between the broadcast time axis (WallClock (UTC)) and the HTML5 video time axis (currentTime).

As described above with reference to FIG. 13, it is assumed herein, for example, that a time stamp set for the segment [Seg (tuner1)] shown in FIG. 13 is UTC 07:03:40 a.m., Oct. 3, 2014.

In this case, the application sets the broadcast time offset (broadcastTimeOffset) to the above time. More specifically, broadcastTimeOffset=UTC 07:03:40 a.m., Oct. 3, 2014 is set.

This time offset corresponds to a difference (time offset) between the broadcast time axis (WallClock (UTC)) and the HTML5 video time axis (currentTime).

More specifically, at the time t3 (=t3h), HTML5 video time: currentTime=0, and the broadcast time: (WallClock (UTC))=07:03:40 a.m., October 3, 014 are set. In this case, the time offset: broadcastTimeOffset=UTC 07:03:40 a.m., Oct. 3, 2014 corresponds to the difference (time offset) between the broadcast time axis (WallClock (UTC)) and an HTML5 video time axis (currentTime).

Note that the processing example of the time offset calculation is a processing example of calculation on the basis of the time stamp of the broadcast reception segment stored in the storage unit as the media source corresponding to a processing target object of the application, i.e., the media source. In this case, data obtained from the media source by using foregoing new API (MSE-API) may be used without change.

More specifically, the time offset calculation may be a process for obtaining time offset information by using following API.

broadcastTimeOffset=mediaSource.broadcastTimeOffset

Alternatively, the time offset information may be obtained from other objects. For example, the offset information may be obtained or calculated via an object such as a communication unit (tuner) and video data as a processing object of the application other than the media source as presented below, for example.

broadcastTimeOffset=navigator.tv.
    currentTuner( ).broadcastTimeOffset broadcastTimeOffset=video.broadcastTimeOffset (Step S306)

In subsequent step S306, the application obtains video and audio source buffers from the tuner media source object obtained in step S303.

The video source buffer corresponds to the source buffer 214 illustrated in FIG. 12, while the audio source buffer corresponds to the source buffer 215 illustrated in FIG. 12.

The respective source buffers 214 and 215 are objects constituted by a part of constituent elements of the media source 213, i.e., objects that can be processed by the application.

Each of the objects corresponds to a broadcast reception segment series stored in the storage unit (buffer) of the receiving device 30.

The video source buffer 214 corresponds to a segment series constituted only by video data stored in the storage unit (buffer) 312 of the receiving device 30 illustrated in FIG. 14.

The audio source buffer 215 corresponds to a segment series constituted only by audio data stored in the storage unit (buffer) 312 of the receiving device 30.

The media source 213 corresponds to a broadcast reception segment series containing video data and audio data stored in the storage unit (buffer) 312 of the receiving device 30.

In step S306, the application obtains video and audio source buffers from the tuner media source object obtained in step S303.

Note that this process is also executed as a process performed under new API described above.

This process corresponds to a following process contained in processing algorithm executed by new API (MSE-API) described above. According to original MSE API, an application generates a new buffer. In case of new API, however, a browser generates a tuner media source object on the basis of the number of video and audio data contained in broadcast reception data, and on the types of codec.

videoSourceBuffer=mediaSource.sourceBuffers[0];
audioSourceBuffer=mediaSoorce.sourceBuffers[1];

(Step S307)

In subsequent step S307, the application obtains the start time (BroadcastAdStartTime) of insertion of the network reception data (such as segment series constituted by MP4 advertisements), a URL list of net reception segment files, and the number of the segment files from metadata (signaling data) received via the broadcast wave.

This process is a process executed along a data channel extending from the tuner 311 to the application execution unit 332 via the metadata (signaling) processing unit 321 as illustrated in FIG. 14.

The broadcast server 21 supplies various types of metadata to the receiving device 30 as signaling data together with content (program). The receiving device 30 receives these metadata via the tuner (communication unit (tuner) 202 in FIG. 12, or tuner 311 of FIG. 14).

The application obtains the start time (BroadcastAdStartTime) of insertion of the network reception data (such as segment series constituted by MP4 advertisements), a URL list of net reception segment files, and the number of the segment files from the metadata (signaling data). These sets of information may be described in a manifest file of MPEG DASH (media presentation description (MPD)).

Accordingly, content reproduction is achievable by adaptive streaming. Moreover, segments of advertisement content may be obtained beforehand and stored in a persistent cache of the receiver by using a service worker to reproduce advertisements having high image quality and high sound quality equivalent to those of a broadcast program without an influence of the network band.

Note that there exist various types of content received via a network and synthesized with broadcast data. In case of advertisement data, for example, advertisement different for each region and user may be provided. In other words, so-called target advertisement may be set.

In this case, different advertisement moving images are provided according to attributes of the receiving device and the user, wherefore settings of the URL list of the net reception segment files, the number of the segment files and the like may be different for each receiving device.

(Steps S308 and S309)

In subsequent step S308, the application obtains a current time (currentTime) of the HTML5 video object set as a processing target in step S301, and constituted only by the broadcast reception segment after the tuner media source has been set as the HTML5 video object in step S304. The current time (currentTime) is time information based on the time axis [HTML5 video time axis (currentTime)] of the application.

In step S309, the application further starts reception of the network reception segment, i.e., a segment storing an MP4 file constituted by advertisement content, for example, via the network.

Processing in steps S308 and S309 corresponds to processing in the period (t3$h$ through t4$h$) described above with reference to FIG. 13.

More specifically, as described above with reference to FIG. 13, the application calculates the synthesis segment reception start time t4$h$ via the network by using a following equation.

$$t4h=\text{VideoAdStartTimeBefore}=t5h-\text{Margin}=\text{VideoAdStarttime}-\text{Margin}=t5-\text{broadcastTimeOffset}=\text{BroadcastAdStartTime}-\text{broadcastTimeOffset}$$

Note that t4$h$:VideoAdStartTimeBefore, t5$h$:VideoAdStarttime, and Margin correspond to time information based on the HTML5 video time axis (currentTime).

The time t5: BroadcastAdStartTime is time information based on the broadcast time axis (WallClock(UTC)).

Note that the application has already obtained the (advertisement: Ad) output start time t5 (BroadcastAdStartTime) from the attribute information (metadata) on the content (program) in step S307.

In addition, broadcastTimeOffset is the time offset calculated in step S305. According to the example described with reference to FIG. 13, broadcastTimeOffset is UTC 07:03:40 a.m., Oct. 3, 2014.

The application calculates the synthesis segment reception start time (VideoAdStartTimeBefore) via the network, i.e., the time t4$h$ shown in FIG. 13 by using these sets of data.

(Steps S310 and S311)

In step S310, the application determines whether or not the time (currentTime) based on the HTML5 video time axis (currentTime) is the synthesis segment reception start time (VideoAdStartTimeBefore) via the network.

When it is determined that the time is the synthesis segment reception start time, the flow proceeds to step S311 to start reception of the synthesis segment via the network, such as the segment storing MP4 advertisement content.

When it is determined that the time is not the synthesis segment reception start time yet, the flow returns to step S308 to repeat processing in steps S308 and S309.

(Step S312)

In step S312, the application executes a process for appending the network reception segment (such as MP4 advertisement) received via the network in step S311 to the positions (VideoAdStartTime) of the video and audio source buffers.

Whole data (segments) set for the video and audio source buffers determined as the processing target objects of the application is provided as objects for processing based on the time axis [HTML5 video time axis (currentTime)] of the application.

The (VideoAdStartTime) specifying the appendance position of the network reception segment is time on the HTML5 video time axis (currentTime)] This time corresponds to the time (t5$h$) described above with reference to FIG. 13.

As described above with reference to FIG. 13, the time (t5$h$=VideoAdStartTime) is calculated by using the advertisement start time t5 (=BroadcastAdStartTime) based on the wall clock (WallClock (UTC)) of the broadcast time system.

The calculation process is performed by using a following equation. The time information discussed with reference to FIG. 13 is used in the description below.

$$=(07:16:20 \text{ a.m., Oct. 3, 2014})-(07:03:40 \text{ a.m., Oct. 3, 2014})=12 \text{ minutes and 40 seconds}$$

Note that the t5$h$:VideoAdStarttime is time information based on the HTML5 video time axis (currentTime).

The time t5: BroadcastAdStartTime is time information based on the broadcast time axis (WallClock(UTC)).

Note that the application has already obtained the output start time t5 (BroadcastAdStartTime) of (Advertisement: Ad) from attribute information (metadata) on the content (program) in step S307.

The application executes a process for appending the network reception segment (such as MP4 advertisement) received via the network in step S311 to the time position of the advertisement start time (VideoAdStartTime) corresponding to the time information based on the HTML5 video time axis (currentTime) thus calculated. In practice, deviation is produced between the value of CurrentTime of the HTML5 video and a Buffered property indicating a buffer range of the segment stored in the buffer of the media source of the tuner due to a delay produced by the processing of the decode and renderer 313. It is therefore preferable that the segment replacement process is performed by using the value of the Buffered property for more accurate timing control.

(Steps S313 and S314)

In subsequent step S313, the application determines whether or not the process for all the network reception segments has been completed.

When it is determined that the process is not completed, the flow returns to step S311 to execute processing after S311 for not processed segments.

When it is determined that the process for all the segments has been completed, the flow proceeds to step S314, and returns to step S307 to process a subsequent net reception segment series (such as subsequent advertisement).

Figure 17:
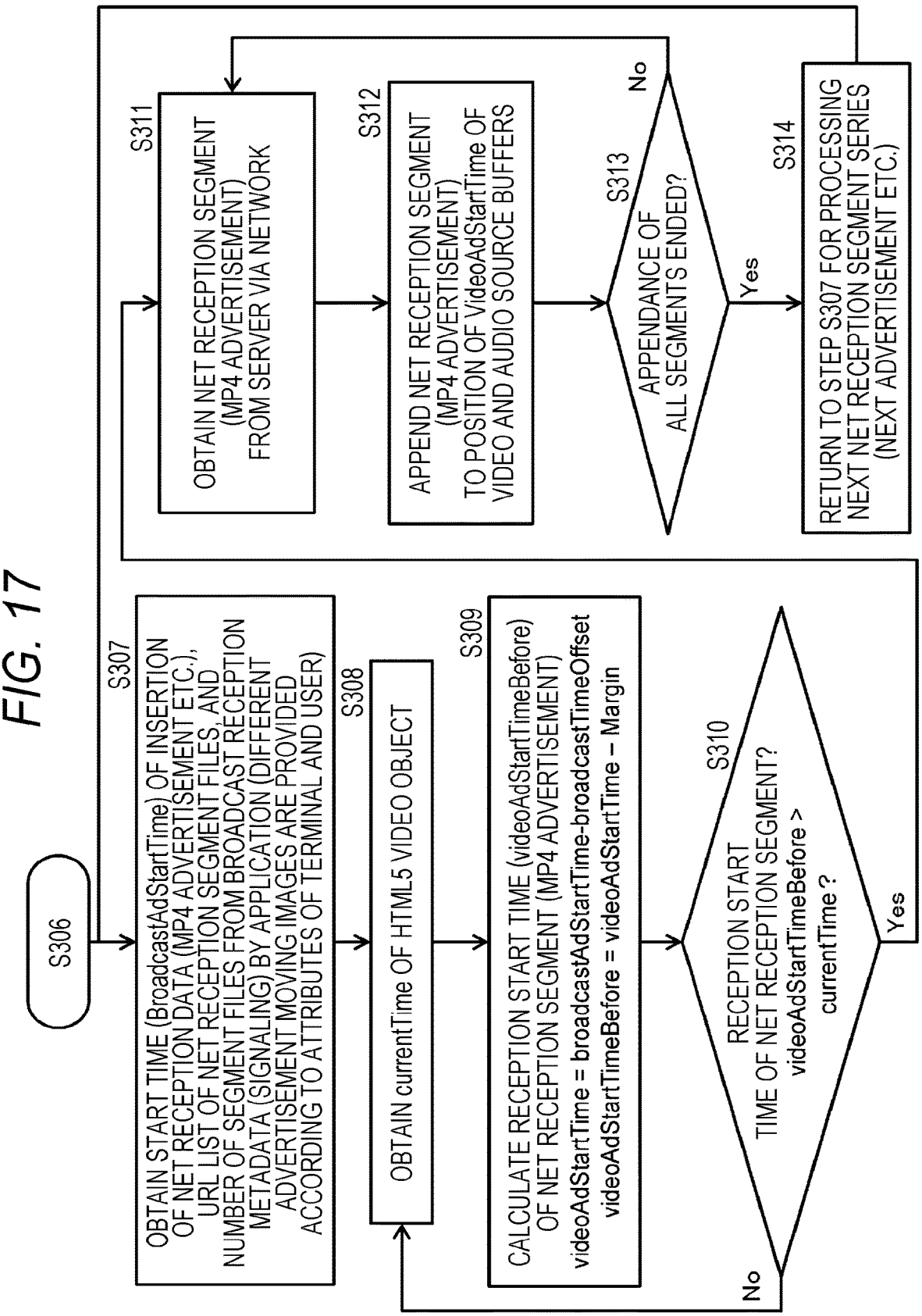
FIG. 17 is a flowchart showing the sequence of the process executed by the application of the receiving device.

Description of the details of the process executed by the application is now completed with reference to the flowchart shown in FIGS. 16 and 17.

As understood from the above description, the application executes the media source update process for replacing a part of the broadcast reception segment stored in the storage unit (buffer) of the receiving device 30 with the network reception segment as illustrated in FIG. 14.

This process achieves replacement of a part of the broadcast wave reception segment with the network reception segment, and realizes data switching display as described above with reference to FIG. 8.

More specifically, this process achieves data output for switching program content corresponding to broadcast reception data into advertisement content corresponding to network reception data at predetermined timing, and thereafter again switching the content into the program content corresponding to broadcast reception data.

According to this embodiment, the tuner reception segment is not stored into nor read from the HTTP server unlike the example described above with reference to FIG. 11.

According to this embodiment, the tuner reception segment is directly set as the source buffer corresponding to the processing target object of the application.

The application replaces a part of the segment of the source buffer constituted only by the broadcast wave reception segment with the network reception segment by the source buffer update process including replacement of the segment of the source buffer.

This source buffer update process is a process executed in an extremely short time in comparison with the data storing and reading process into and from the HTTP server, and therefore completes output of the segment subjected to replacement without producing a delay.

[9. Processing Example Using Service Worker (SW) and Application]

The foregoing application may be set as a management application for the service worker (SW) described above.

When set as the management application for the service worker (SW), the application is kept stored in the storage unit of the receiving device even after an end of content (program) providing the application. In this case, execution of the application is allowed at arbitrary timing even during reproduction of another program, or disconnection of the network in an offline state.

For example, the service worker (SW) has a function for performing a process for selectively obtaining data transmitted via a broadcast wave or a network, a process for controlling start timing of the application, and other processes.

For example, following processes are performed by a combination of the service worker (SW) and the application.

Processing Example 1

The application obtains a viewing history of the user, and notifies the service worker (SW) about obtained viewing history information as metadata.

The service worker (SW) selects and obtains an advertisement matching with interest of the user from various types of advertisement data transmitted via the broadcast wave on the basis of the metadata (viewing history information).

The application executes a process for displaying advertisement content selectively obtained by the service worker (SW).

This process allows intensive supply of advertisements matching with interest of the user.

Processing Example 2

The service worker (SW) obtains advertisement data, and metadata containing recorded output time of the advertisement data beforehand, and stores these sets of data in the storage unit of the receiving device.

The application obtains the advertisement data and metadata stored in the storage unit of the receiving device, and executes a process for outputting the obtained advertisement data in accordance with an output time recorded in the metadata.

The foregoing processes are performed by the combination of the service worker (SW) and the application, for example.

Moreover, while the foregoing embodiment displays the advertisement by replacement display as illustrated in FIG. 8, display with superimposed advertisement content as illustrated in FIG. 7 is easily realizable. This superimposed display uses two media sources, i.e., a media source storing broadcast reception data, and a media source reproducing network reception data to be superimposed. In this case, there are also generated two HTML5 video objects, for each of which the corresponding one of the two media sources is set.

A media source for reproducing data received via the network is generated by ordinary MSE-API. As described in this embodiment, it is possible to match the time axis of the HTML5 video for which the media source of broadcast data has been set, with the time axis of broadcast. Accordingly, when the HTML5 video time axis for reproducing data received via the network is matched with the time axis of the HTML5 video of broadcast data, superimposed display of advertisement content is achievable at arbitrary timing of the broadcast time.

More specifically, a MediaGroup property is defined for the HTML5 video object, wherefore synchronization of reproduction of a plurality of videos is realizable such that CurrentTime of each of the videos simultaneously proceeds. In case of superimposed display, the flow set as in FIG. 16 is performed under following JavaScript (registered trademark).

<script> var videoTuner=document.getElementById('vTuner');

var tuner=navigator.tv.currentTuner( );

var mediaSourceTuner=.tuner.getMediaSource( );

mediaSourceTuner.addEventListener('sourceopen',onSourceOpen.bind(this,video));

```
videoTuner.src=window.URL.createObjectURL(media-
Sourcetuner);
    var
videoSourceBufferTuner=mediaSourceTuner.sourceBuffers
[0];
    var
audioSourceBufferTuner=mediaSourceTuner.sourceBuffers
[1];
    var videoAd=document.getElementById('vAd');
    var mediaSourceAd=new MediaSource( );
    mediaSourceAd.addEventListener('sourceopen',onSourc
eOpen.bind(this, video));
    videoAd.src=window.URL.createObjectURL(media-
SourceA d);
    var
videoSourceBufferAd=mediaSourceAd.addSourceBuffer
('video/mp4;codecs="avc1.4d401f"');
    var
audioSourceBufferAd=mediaSourceAd.addSourceBuffer
('audio/mp4;codecs="mp4a.40.2"')
    videoTuner.mediaGroup="SYNC";
    videoAd.mediaGroup="SYNC";
</script>
```

A flow of the process for appending segments of advertisement content in superimposed display is substantially similar to the foregoing flow of the process as shown in FIG. 17. The difference between the process described above and the process in this superimposed display is only the point that the application of the superimposed display inserts segment data on the advertisement received from the network into the position of the advertisement start time of not the media source of the broadcast data, but the source buffer (audioSourceBufferAd, videoSourceBufferAd) of the media source (mediaSourceAd) of the network.

According to an assumption of this example, CurrentTimes of respective video objects having the same value of the MediaGroup property proceed in synchronization with each other. When segment data at the reproduction position is stored in any one of MediaSources synchronized with each other, CurrentTime is updated and continued for reproduction. In this case, segment data is appended to only a time range of an advertisement section in the source buffer of MediaSourceAd. On the other hand, for synchronizing HTML5 videos without setting MediaSoucer, this synchronization is realizable by extending the HTML5 videos in such a manner as to set a synchronous time offset (for example, video.mediaGroupTimeOffset) on respective HTML5 video time axes.

[10. Configuration Example of Transmitting Device and Receiving Device]

Device configuration examples of the transmitting device (server) 20 corresponding to a communication device, and the receiving device (client) 30 are hereinafter described with reference to FIGS. 18 and 19.

Figure 18:
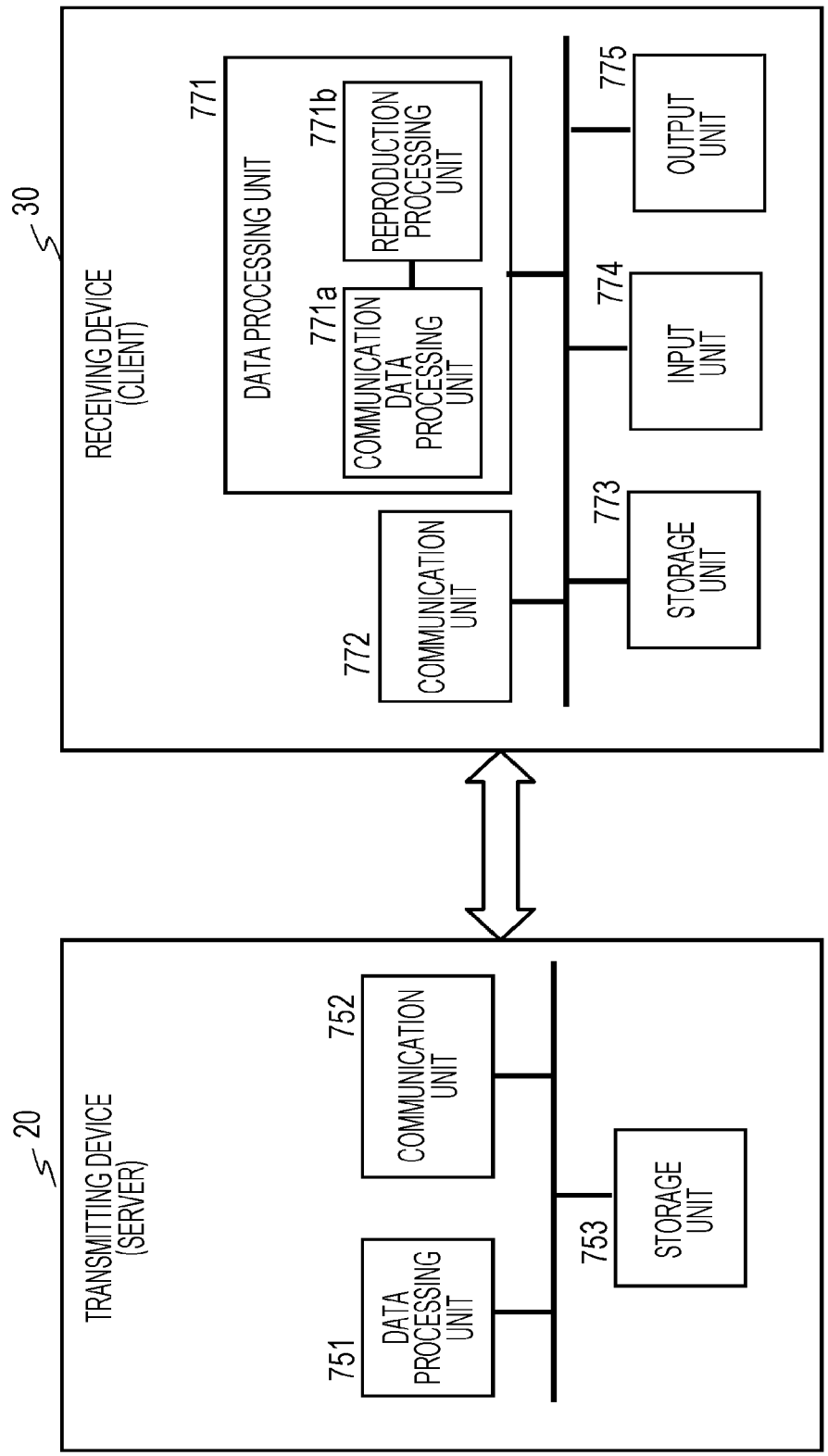
FIG. 18 is a diagram illustrating a configuration example of a transmitting device and a receiving device corresponding to communication devices.

FIG. 18 illustrates configuration examples of the transmitting device (server) 20 and the receiving device (client) 30.

The transmitting device (server) 20 includes a data processing unit 751, a communication unit 752, and a storage unit 753.

The receiving device (client) 30 includes a data processing unit 771, a communication unit 772, a storage unit 773, an input unit 774, and an output unit 775.

The data processing unit includes a communication data processing unit 771a, and a reproduction processing unit 771b.

The data processing unit 751 of the transmitting device (serer) 20 performs various types of data processing for executing a data distribution service. For example, the data processing unit 751 performs processes of generation and transmission control of constituent data of the distribution service. The data processing unit 751 further performs processes of generation and transmission of applications, service workers (SWs), and other various types of data and signaling data supplied to the receiving device (client) 30.

The communication unit 752 performs transmission processes such as distribution of AV segments, applications, service workers (SWs), and various types of data and signaling data used by applications, for example.

The storage unit 753 stores AV segments, applications, service workers (SWs), and various types of data and signaling data used by applications, for example, as distribution targets.

The storage unit 753 is further used as a work area for data processing executed by the data processing unit 751, and a storage area for various types of parameters.

On the other hand, the receiving device (client) 30 includes a data processing unit 771, a communication unit 772, a storage unit 773, an input unit 774, and an output unit 775.

The communication unit 772 receives data distributed from the transmitting device (server) 20, such as AV segments, applications, service workers (SWs), and data and signaling data used by applications, for example.

The data processing unit 771 includes a communication data processing unit 771a and a reproduction processing unit 771b to perform processing of the embodiment described above, for example.

More specifically, the data processing unit 771 performs data processing by using applications, API, and service workers (SWs), for example.

Instruction commands from the user, such as channel selection, application start, installation, and other various commands are input via the input unit 774.

Reproduction data is output to the output unit 775 such as a display unit and a speaker.

The storage unit 773 stores AV segments, service workers (SWs), applications, and data and signaling data used by applications, for example.

The storage unit 773 is further used as a work area for data processing executed by the data processing unit 771, and a storage area for various types of parameters.

Figure 19:
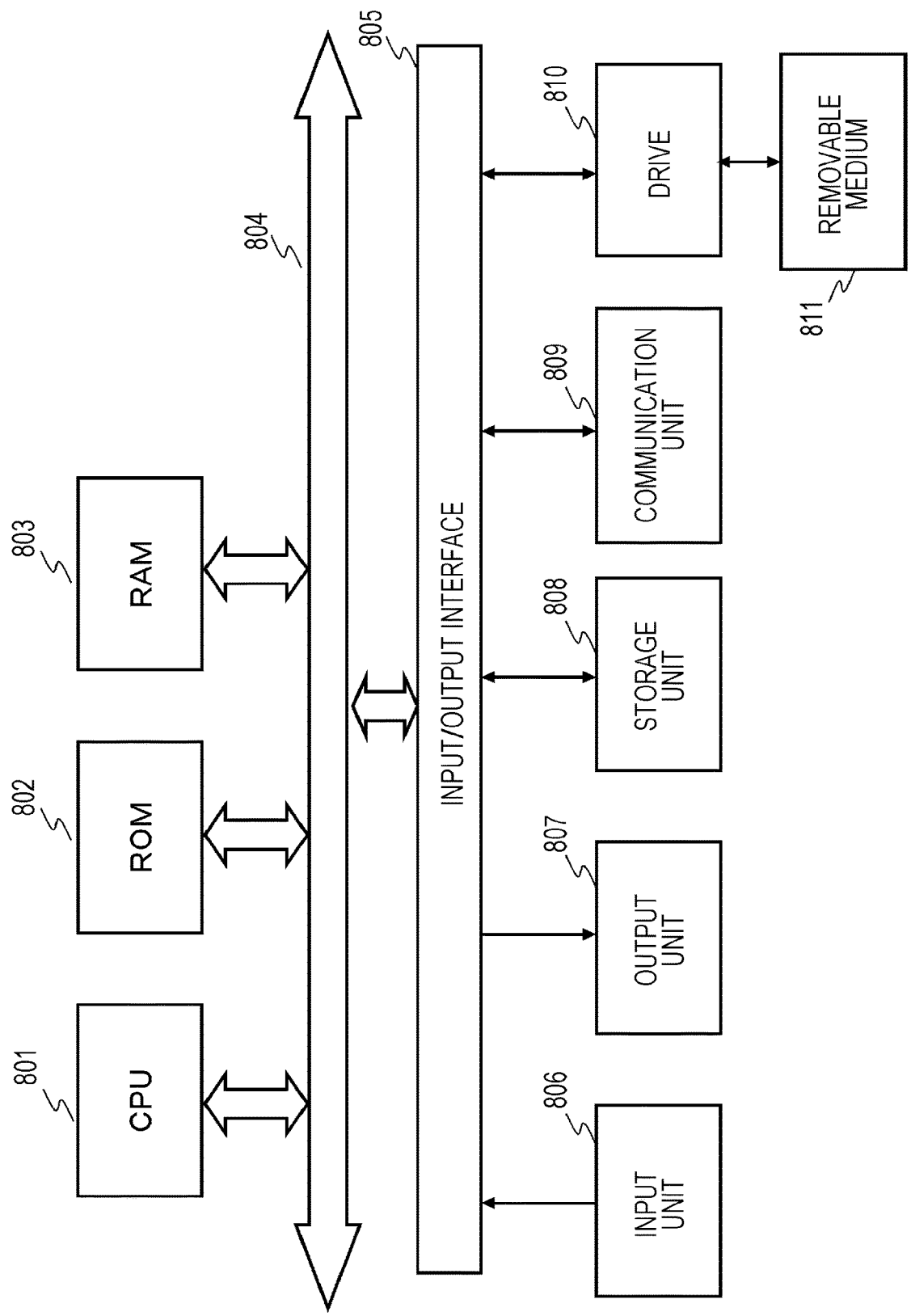
FIG. 19 is a diagram illustrating a hardware configuration example of the transmitting device and the receiving device corresponding to communication devices.

FIG. 19 illustrates a hardware configuration example of a communication device applicable to the transmitting device 20 and the receiving device 30.

A central processing unit (CPU) 801 functions as a data processing unit which executes various types of processing under programs stored in a read only memory (ROM) 802 or a storage unit 808. For example, the CPU executes processes in accordance with the sequence described in the foregoing embodiment. A random access memory (RAM) 803 stores programs executed by the CPU 801, data, and others. The respective CPU 801, the ROM 802, and the RAM 803 are connected to each other via a bus 804.

The CPU 801 is connected to an input/output interface 805 via the bus 804. An input unit 806 constituted by various types of switches, a keyboard, a mouse, a microphone and the like, and an output unit 807 constituted by a display, a speaker and the like are connected to the input/output interface 805. The CPU 801 executes various types of processing in response to an instruction input from the input unit 806, and outputs a processing result to the output unit 807, for example.

The storage unit 808 connected to the input/output interface 805 is constituted by a hard disk, for example, and stores the programs executed by the CPU 801 and various types of data. The communication unit 809 functions as a transmission and reception unit of data communication via a network such as the Internet and a local area network, and further functions as a transmission and reception unit of a broadcast wave to communicate with an external device.

A drive 810 connected to the input/output interface 805 drives a removable medium 811 such as a magnetic disk, an optical disk, a magneto-optical disk, and a semiconductor memory like a memory card to record or read data.

Note that encoding or decoding of data may be performed by the CPU 801 as the data processing unit, or by a codec as dedicated hardware for performing encoding or decoding.

[11. Summary of Configuration of Present Disclosure]

The embodiment according to the present disclosure has been described in detail with reference to the particular examples. It is obvious, however, that modifications and substitutes for the embodiment may be made by those skilled in the art without departing from the subject matters of the present disclosure. Accordingly, the disclosure of the present invention has been presented not for the purpose of limiting the scope of the present technology, but presented only by way of example. The subject matters of the present disclosure should be defined in consideration of the appended claims.

Note that a technology disclosed in the present specification may have the following configurations.

(1) A receiving device including a data processing unit that discloses a buffering process for reception data received by the receiving device as a media source object corresponding to a processing object of media reproduction by an application executed by the receiving device.

(2) The receiving device according to (1), wherein the data processing unit sets the reception data as the media source object by applying an application programming interface (API), and the application executes a process for obtaining a status of the buffer, and a process of replacement or appendance for the reception data stored in the buffer.

(3) The receiving device according to (1) or (2), wherein the data processing unit obtains a time offset corresponding to a time difference between an application media reproduction time axis that specifies a processing time by the application, and a video and audio reproduction time axis used for the reception data.

(4) The receiving device according to (3), wherein the data processing unit obtains the time offset by an application process of the application or the API.

(5) The receiving device according to any one of (1) through (4), wherein the application executes a synthesis process for synthesizing reception data stored in the data processing unit and application reception data received by the application as a process for the media source object.

(6) The receiving device according to (5), wherein the application determines an insertion time position of the application reception data into the reception data by using a time offset obtained as a time difference between an application media reproduction time axis that specifies a processing time by the application and a video and audio reproduction time axis used for the reception data.

(7) The receiving device according to (6), wherein the application determines a reception start time of the application reception data by using the time offset.

(8) The receiving device according to any one of (5) through (7), wherein the application executes a segment replacement process for replacing a segment constituting the reception data with a segment constituting the application reception data.

(9) A transmitting device including a communication unit that transmits an application used by a receiving device, wherein the application executes a synthesis process of reception data received by the receiving device and application reception data received by the application on the basis of a media source object that discloses a buffering process for the reception data.

(10) The transmitting device according to (9), wherein the receiving device that executes the application performs a process for setting the reception data as the media source object by applying an application programming interface (API), and the application executes a process that uses the media source object set by the API.

(11) A data processing method performed by a receiving device, wherein a data processing unit of the receiving device sets reception data as a media source object corresponding to a processing object of media reproduction by an application executed by the receiving device.

(12) A data processing method executed by a transmitting device, wherein a communication unit of the transmitting device transmits an application used by a receiving device, the application executes a synthesis process for synthesizing reception data received by the receiving device and application reception data received by the application on the basis of a media source object that discloses a buffering process for the reception data.

In addition, a series of processes described in the specification may be executed by hardware, software, or a complex configuration of hardware and software. For executing the processes by software, a program recording a processing sequence may be installed in a memory incorporated in dedicated hardware within a computer, or may be installed in a general-purpose computer capable of executing various types of processes. For example, the program may be recorded in a recording medium beforehand. The program may be installed into a computer from the recording medium, or received via a network, such as a Local Area Network (LAN) and the Internet, and installed in a recording medium such as a built-in hard disk.

Furthermore, discussed in this embodiment is replacement of segments of program content received from broadcasting by broadband reception, with segments of advertisement content received via a network. However, reception paths are not limited to the specific examples presented herein. This embodiment is also applicable to reception of both program content and advertisement content via a network, or via broadcast.

Note that the respective processes described in the specification are not only to be executed in time series described in the specification, but may be executed in parallel or individually in accordance with the processing capacity of the devices used for executing the processes, or as necessary. Furthermore, the system in the present specification refers to a logical collective configuration constituted by a plurality of devices, and includes a set of constituent devices not contained in an identical housing.

INDUSTRIAL APPLICABILITY

As described above, a device and a method for efficiently performing a synthesis process of broadcast reception data and network reception data are realizable according to a configuration of an embodiment of the present disclosure.

More specifically, broadcast reception data received by a receiving device via a communication unit is set as a media source object corresponding to a processing object of an application executed by the receiving device under an application programming interface (API). The application executes a synthesis process of the broadcast reception data and network reception data received via a network as processing for the media source object. The application obtains a time offset corresponding to a time difference between an application time axis and a broadcast time axis on the basis of an API application process to execute a high-accuracy and low-delay data synthesis process.

This configuration achieves low-delay and high-accuracy synthesis process and output process of the broadcast reception data and the network reception data. In this case, insertion of advertisement content from the network into broadcasted program content is easily achievable, wherefore merger of broadcast services and Internet services is expected to develop.

REFERENCE SIGNS LIST

- 10 Communication system
- 20 Transmitting device
- 21 Broadcast server
- 22 Data distribution server
- 30 Receiving device
- 31 TV
- 32 PC
- 33 Portable terminal
- 50 Signaling data
- 60 AV segment
- 70 Other data
- 90 Display control unit of receiving device
- 91 Display processing unit
- 92 Service worker (SW)
- 93 Cache
- 95, 96 Web page
- 101 High bitrate data
- 102 Middle bitrate data
- 103 Low bitrate data
- 104 Manifest file
- 105 Reproduction data
- 110 Media source
- 111 to 113 Source buffer
- 114 Track buffer
- 125 Broadcast reception segment
- 126 Network reception segment
- 127 Reproduction segment
- 131 Antenna
- 132 Communication unit (tuner)
- 133 HTTP server
- 134 Image decoder
- 135 Image display unit
- 136 Audio decoder
- 137 Audio output unit
- 140 Browser
- 141 XHR
- 142 Application
- 143 Media source
- 144, 145 Source buffer
- 201 Antenna
- 202 Communication unit (tuner)
- 210 Browser
- 212 Application
- 213 Media source
- 214, 215 Source buffer
- 221 Image decoder
- 222 Image display unit
- 223 Audio decoder
- 224 Audio output unit
- 225 Reproduction segment
- 310 Broadcast reception data processing unit
- 311 Tuner
- 312 Storage unit (buffer)
- 313 Decoder and renderer
- 321 Metadata (signaling) processing unit
- 322 Buffer management unit
- 330 Network reception data processing unit
- 331 Network I/F
- 332 Application execution unit
- 333 Graphic system
- 341 Synthesis unit
- 751 Data processing unit
- 752 Communication unit
- 753 Storage unit
- 771 Data processing unit
- 772 Communication unit
- 773 Storage unit
- 774 Input unit
- 775 Output unit
- 801 CPU
- 802 ROM
- 803 RAM
- 804 Bus
- 805 Input/output interface
- 806 Input unit
- 807 Output unit
- 808 Storage unit
- 809 Communication unit
- 810 Drive
- 811 Removable medium

The invention claimed is:

1. A receiving device, comprising:
circuitry configured to
obtain an application via a broadcast,
execute the application related to a program or a channel included in the broadcast,
set broadcast reception data from the broadcast as a media source object corresponding to a processing object of media reproduction,
obtain, based on the application, broadcast content segment information of broadcast content in the broadcast reception data that is stored in a buffer associated with the media source object, and
perform, based on an application programming interface (API) used by the application and the broadcast content segment information of a segment of the broadcast content to be replaced being obtained, replacement or appendance of the broadcast content in the broadcast reception data stored in the buffer with network content in application reception data received via a network.

2. The receiving device according to claim 1, wherein the circuitry is configured to obtain a time offset corresponding to a time difference between an application media reproduction time axis that specifies a processing time by the application, and a video and audio reproduction time axis used for the broadcast content in the broadcast reception data.

3. The receiving device according to claim 1, wherein the circuitry is configured to synthesize, based on the application, the broadcast content of the broadcast reception data stored by the circuitry and the network content in the application reception data received by the application as a process for the media source object.

4. The receiving device according to claim 1, wherein the broadcast reception data is set as the media source object without a reading process for the broadcast reception data and without a generation process of the media source object by the application.

5. The receiving device according to claim 1, wherein the circuitry is configured to perform, based on the application, the replacement or appendance for the media source object by replacing the segment of the broadcast content in the broadcast reception data stored in the buffer with a segment of the network content in the application reception data received by the application.

6. The receiving device according to claim 1, wherein the circuitry is further configured to replace, based on the application, the segment of the broadcast content in the broadcast reception data stored in the buffer with a segment of the network content in the application reception data received from a server.

7. The receiving device according to claim 1, wherein the circuitry is further configured to append, based on the application, the segment of the broadcast content in the broadcast reception data stored in the buffer to a segment of the network content in the application reception data received from a server.

8. The receiving device according to claim 1, wherein the circuitry is further configured to generate a media source that produces data of the replacement or appendance for the broadcast content in the broadcast reception data stored in the buffer.

9. The receiving device according to claim 1, wherein the application is a Hypertext Markup Language 5 (HTML5) application.

10. The receiving device according to claim 1, wherein the network content includes advertisement content.

11. The receiving device according to claim 1, further comprising: a display.

12. The receiving device according to claim 2, wherein the circuitry is configured to obtain the time offset based on the application.

13. The receiving device according to claim 3, wherein the application is configured to determine an insertion time position of the network content in the application reception data into the broadcast content in the broadcast reception data by using a time offset obtained as a time difference between an application media reproduction time axis that specifies a processing time by the application and a video and audio reproduction time axis used for the broadcast content in the broadcast reception data.

14. The receiving device according to claim 3, wherein the circuitry is configured to replace, based on the application, the segment of the broadcast content in the broadcast reception data with a segment of the network content in the application reception data.

15. The receiving device according to claim 13, wherein the application is configured to determine a reception start time of the network content in the application reception data by using the time offset.

16. The receiving device according to claim 8, wherein the circuitry is further configured to generate a Hypertext Markup Language 5 (HTML5) video object corresponding to the media source.

17. The receiving device according to claim 11, further comprising: a tuner configured to receive the broadcast.

18. A data processing method, comprising:
obtaining an application via a broadcast,
executing the application related to a program or a channel included in the broadcast;
setting, by circuitry of a receiving device, broadcast reception data from the broadcast as a media source object corresponding to a processing object of media reproduction;
obtaining, based on the application, broadcast content segment information of broadcast content in the broadcast reception data that is stored in a buffer associated with the media source object; and
performing, based on an application programming interface (API) used by the application and the broadcast content segment information of a segment of the broadcast content to be replaced being obtained, replacement or appendance of the broadcast content in the broadcast reception data stored in the buffer with network content in application reception data received via a network.

19. A data processing method, comprising:
transmitting, by transmission circuitry, a broadcast including broadcast reception data to a receiving device that executes an application, wherein
the application is obtained via the broadcast and is related to a program or a channel included in the broadcast,
the broadcast reception data is set as a media source object by the application,
broadcast content segment information of broadcast content in the broadcast reception data that is stored in a buffer associated with the media source object is obtained by the application, and
based on an application programming interface (API) used by the application and the broadcast content segment information of a segment of the broadcast content to be replaced being obtained, the broadcast content in the broadcast reception data stored in the buffer is replaced or appended with network content in application reception data received via a network.

20. The data processing method according to claim 19, wherein the broadcast content in the broadcast reception data and the network content in the application reception data received by the application are synthesized as a process for the media source object.

21. A receiving device, comprising:
circuitry configured to
obtain a web application from a transmitting device,
execute the web application related to a program or a channel,
set broadcast reception data from a broadcast as a media source object corresponding to a processing object of media reproduction,
obtain, based on the web application, broadcast content segment information of broadcast content in the broadcast reception data that is stored in a buffer associated with the media source object, and
perform, based on an application programming interface (API) used by the web application and the broadcast content segment information of a segment of the broadcast content to be replaced being obtained, replacement or appendance of the broadcast content in the broadcast reception data stored in the buffer with network content in application reception data received via a network.

* * * * *